US012288425B2

(12) United States Patent
Waagen et al.

(10) Patent No.: US 12,288,425 B2
(45) Date of Patent: Apr. 29, 2025

(54) VEHICLE HEALTH MANAGEMENT USING A COUNTERFACTUAL MACHINE LEARNING MODEL TO OPTIMIZE MAINTENANCE PARAMETERS

(71) Applicant: The Boeing Company, Chicago, IL (US)

(72) Inventors: Alexander Waagen, San Jose, CA (US); Aruna Jammalamadaka, Camarillo, CA (US); Alice A. Murphy, Mesa, AZ (US); Derek S. Fok, Mesa, AZ (US); Douglas Peter Knapp, Ridley Park, PA (US); Tsai-Ching Lu, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 17/805,007

(22) Filed: Jun. 1, 2022

(65) Prior Publication Data

US 2023/0394889 A1 Dec. 7, 2023

(51) Int. Cl.
*G07C 5/00* (2006.01)
*G06F 18/214* (2023.01)
*G07C 5/08* (2006.01)

(52) U.S. Cl.
CPC .......... *G07C 5/006* (2013.01); *G06F 18/214* (2023.01); *G07C 5/0816* (2013.01); *G07C 5/0841* (2013.01)

(58) Field of Classification Search
None
See application file for complete search history.

(56) References Cited

U.S. PATENT DOCUMENTS

| 7,260,501 B2 | 8/2007 | Pattipatti et al. |
| 7,536,277 B2 | 5/2009 | Pattipatti et al. |
| 2012/0326883 A1 | 12/2012 | Angelis et al. |

(Continued)

FOREIGN PATENT DOCUMENTS

| WO | 2021157005 A1 | 8/2021 |
| WO | 2022069498 A1 | 4/2022 |

OTHER PUBLICATIONS

European Patent Office, Extended Search Report, dated Jun. 27, 2023, regarding Application No. EP23175869.9, 9 pages.

(Continued)

*Primary Examiner* — Raymond L Nimox
(74) *Attorney, Agent, or Firm* — Yee & Associates, P.C.

(57) ABSTRACT

A method, apparatus, system, and computer program product for managing a platform. A computer system generates a training dataset comprising historical metric values from historical sensor information for a set of metrics for a part and historical maintenance events for the part. The computer system trains a machine learning model using the training dataset. The computer system determines different maintenance thresholds for maintenance parameters for a metric in the set of metrics for performing maintenance on the part using the machine learning model trained with the training dataset. The computer system selects maintenance thresholds for the maintenance parameters from the maintenance thresholds meeting an objective to form a maintenance plan. The maintenance plan is used to determine when a maintenance action is needed for the part.

20 Claims, 11 Drawing Sheets

(56) References Cited

U.S. PATENT DOCUMENTS

| | | | |
|---|---|---|---|
| 2015/0160098 | A1 | 6/2015 | Noda et al. |
| 2016/0153806 | A1 | 6/2016 | Ciasulli et al. |
| 2017/0185902 | A1 | 6/2017 | Kumar et al. |
| 2017/0193372 | A1* | 7/2017 | Schimert .................. G06N 5/04 |
| 2020/0331636 | A1 | 10/2020 | Mulholland et al. |
| 2020/0379454 | A1 | 12/2020 | Trinh et al. |
| 2021/0277906 | A1* | 9/2021 | Megchiani .......... F04D 15/0088 |
| 2021/0326652 | A1* | 10/2021 | Hazard .................. G06N 5/045 |
| 2022/0130143 | A1* | 4/2022 | Rodriguez Lopez .. G06V 10/82 |

OTHER PUBLICATIONS

Office Action dated Jun. 13, 2024, regarding U.S. Appl. No. 17/805,003, 46 pages.

Alaa et al., "Deep Counterfactual Networks with Propensity-Dropout," Jun. 19, 2017, 6 pages, accessed May 13, 2022, available at https://arxiv.org/abs/1706.05966v1.

Bica et al., "Estimating counterfactual treatment outcomes over time through adversarially balanced representations," Feb. 10, 2020, 28 pages, accessed Apr. 14, 2022, available at https://arxiv.org/abs/2002.04083.

Hvilshøj et al., "ECINN: Efficient Counterfactuals from Invertible Neural Networks," 32nd British Machine Vision Conference 2021, Nov. 22, 2021, 12 pages.

Lei et al., "Machinery health prognostics: A systematic review from data acquisition to RUL prediction," Mechanical Systems and Signal Processing, vol. 104, May 1, 2018, pp. 799-834.

Li et al., "Deep Domain Generalization via Conditional Invariant Adversarial Networks," Computer Vision—ECCV 2018, Oct. 7, 2018, 16 pages.

Louhichi et al., "A cost model for predictive maintenance based on risk-assessment," 13ème Conférence internationale Cigi Qualita 2019, Jun. 2019, 9 pages.

Luo et al., "Model-based Prognostic Techniques," Proceedings Autotestcon 2003. IEEE Systems Readiness Technology Conference, 2003, pp. 330-340.

Robey et al., "Model-Based Domain Generalization," Advances in Neural Information Processing Systems (NeurIPS 2021), vol. 34, 2021, 16 pages.

Venkatasubramanian et al., "A review of process fault detection and diagnosis: Part III: Process history based methods," Computers and Chemical Engineering, vol. 27, No. 3, Mar. 15, 2003, pp. 327-346.

Ni et al., "Aircraft Maintenance of Line Replaceable Units," U.S. Appl. No. 17/654,199, filed Mar. 9, 2022, 95 pages.

Waagen et al., "Vehicle Health Management Using a Counterfactual Machine Learning Model," U.S. Appl. No. 17/805,003, filed Jun. 1, 2022, 79 pages.

European Patent Office Extended Search Report, dated Oct. 25, 2023, regarding Application No. EP23164122.6, 12 pages.

Final Office Action, dated Dec. 9, 2024, regarding U.S. Appl. No. 17/805,003, 58 pages.

\* cited by examiner

VEHICLE HEALTH MANAGEMENT USING A COUNTERFACTUAL MACHINE LEARNING MODEL TO OPTIMIZE MAINTENANCE PARAMETERS

CROSS-REFERENCE TO RELATED APPLICATION

This application is related to the following patent application entitled "Vehicle Health Management Using a Counterfactual Machine Learning Model", application Ser. No. 17/805,003, filed Jun. 1, 2022, and assigned to the same assignee. The aforementioned application is incorporated herein by reference in its entirety.

BACKGROUND INFORMATION

1. Field

The present disclosure relates generally to a vehicle management system and in particular to vehicle health management using a counterfactual machine learning model.

2. Background

Aircraft maintenance involves performing various maintenance operations on an aircraft to ensure continued desired operation of the aircraft or aircraft component. The maintenance operations can include inspection, replacement, reworking inconsistencies in components, or other operations that maintain compliance with airworthiness directives and maintenance standards.

Aircraft maintenance is often performed on a scheduled basis. In some cases, unscheduled aircraft maintenance can occur when a particular component no longer performs as desired. Unscheduled aircraft maintenance can be challenging depending on deployment location of an aircraft and the availability of spare components in different operational regions. Current maintenance systems rely on reactionary maintenance schedules for unscheduled maintenance. For example, aircrafts such as rotorcraft may be essentially grounded while replacement components and repairs are requested, ordered, and then delivered to the location of the rotorcraft. This type of maintenance can increase the time that aircraft is out of service.

Therefore, it would be desirable to have a method and apparatus that take into account at least some of the issues discussed above, as well as other possible issues. For example, it would be desirable to have a method and apparatus that overcome a technical problem with scheduling aircraft maintenance.

SUMMARY

An embodiment of the present disclosure provides a method for managing a platform. A computer system generates a domain invariant representation of historical metric values from historical sensor information for a set of metrics and historical maintenance events for a part. A bias caused by the historical maintenance events is reduced in the domain invariant representation. The computer system trains a counterfactual machine learning model using the domain invariant representation. The computer system determines different maintenance thresholds for maintenance parameters for a metric in the set of metrics for performing maintenance on the part using the counterfactual machine learning model trained with the domain invariant representation. The computer system selects maintenance thresholds for the maintenance parameters from the different maintenance thresholds meeting an objective to form a maintenance plan, wherein the maintenance plan is used to determine a maintenance action for the part.

Another embodiment of the present disclosure provides a method for managing a platform. A computer system generates a training dataset comprising historical metric values from historical sensor information for a set of metrics and historical maintenance events for a part. The computer system trains a machine learning model using the training dataset. The computer system determines different maintenance thresholds for maintenance parameters for a metric in the set of metrics for performing maintenance on the part using the machine learning model trained with the training dataset. The computer system selects maintenance thresholds for the maintenance parameters from the different maintenance thresholds meeting an objective to form a maintenance plan, wherein the maintenance plan is used to determine when a maintenance action is needed for the part.

Yet another embodiment of the present disclosure provides a platform management system comprising a computer system and a platform manager in the computer system. The platform manager is configured to generate a domain invariant representation of historical metric values from historical sensor information for a set of metrics and historical maintenance events for a part, wherein a bias caused by the historical maintenance events is reduced in the domain invariant representation. The platform manager is configured to train a counterfactual machine learning model using the domain invariant representation. The platform manager is configured to determine different maintenance thresholds for maintenance parameters for a metric in the set of metrics for performing maintenance on the part using the counterfactual machine learning model trained with the domain invariant representation. The platform manager is configured to select maintenance thresholds for the maintenance parameters from the different maintenance thresholds meeting an objective to form a maintenance plan. The maintenance plan is used to determine a maintenance action for the part.

Still another embodiment of the present disclosure provides a platform management system comprising a computer system and a platform manager in the computer system. The platform manager is configured to generate a training dataset comprising historical metric values from historical sensor information for a set of metrics and historical maintenance events for a part. The platform manager is configured to train a machine learning model using the training dataset. The platform manager is configured to determine different maintenance thresholds for maintenance parameters for a metric in the set of metrics for performing maintenance on the part using the machine learning model trained with the training dataset. The platform manager is configured to select maintenance thresholds for the maintenance parameters from the maintenance thresholds meeting an objective to form a maintenance plan. The maintenance plan is used to determine when a maintenance action is needed for the part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
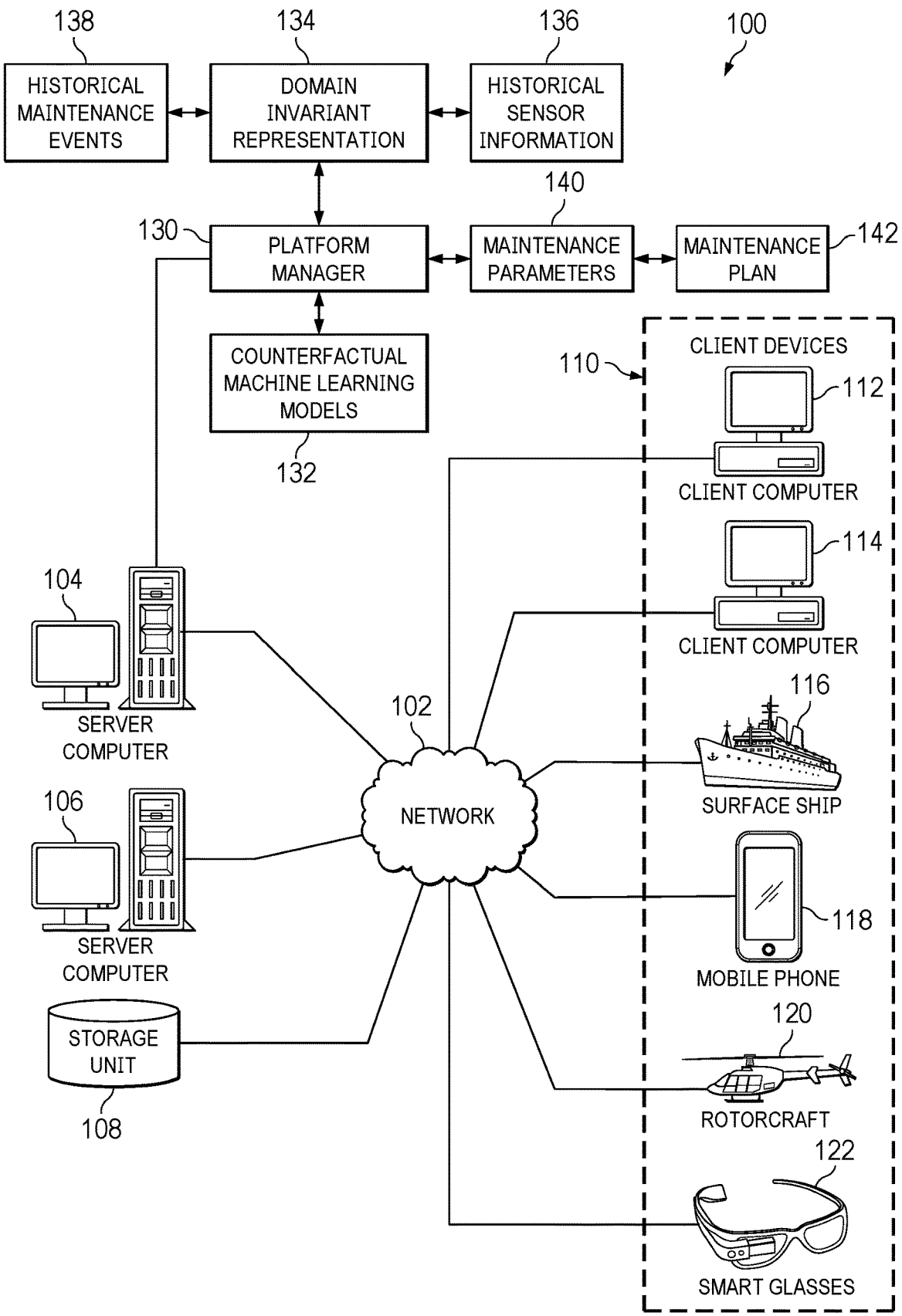
FIG. 1 is a pictorial representation of a network of data processing systems in which illustrative embodiments can be implemented.

The illustrative embodiments recognize and take into account one or more different considerations as described herein. The illustrative embodiments recognize and take into account one or more different considerations. For example, the illustrative embodiments recognize and take into account that maintenance for aircraft or other platforms can be easier to manage having knowledge of impending changes in part performance that result in undesired aircraft performance. For example, the illustrative embodiments recognize and take into account that the undesired aircraft performance may be, for example, reduction in fuel efficiency, flight envelopes, maximum altitude, or aircraft speed.

The illustrative embodiments recognize and take into account that accurately knowing when maintenance is needed for different parts and aircraft is extremely useful. For example, knowing when maintenance is needed can enable procuring parts ahead of time and can enable allocation of resources for maintenance. Those embodiments recognize and take into account that with currently used scheduling of maintenance, parts may have undesired performance before maintenance occurs. This undesired performance can include at least one of part failure or out of tolerance part performance. Examples of performance out of part performance tolerance can include at least one of an operating temperature, pressure, a fuel efficiency, revolutions per minute, actuator speed, or other parameter that may have a value that is out of a range for desired performance.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Current systems for prognostic and diagnostics of aircraft do not use models or do not incorporate maintenance events into modeling. As result, these current systems have limited ability to provide insight into decision-making regarding maintenance for aircraft.

Thus, illustrative embodiments provide a method, apparatus, system, and computer program product for determining maintenance for aircraft and other platforms that utilizes models that take into account maintenance events. One or more illustrative examples can predict the future state of the model for both when a maintenance event occurs and when a maintenance event does not occur. In the illustrative example, these models can be used to identify thresholds for performing maintenance. In the illustrative examples, models can take the form of counterfactual machine learning models.

In one illustrative example, sensor data for a set of metrics for a part in a platform and historical maintenance events for the part is received from a sensor system for the platform. A computer system generates a domain invariant representation of metric values for the set of metrics and the historical maintenance events. A bias caused by the historical maintenance events is reduced in the domain invariant representation. The computer system trains a counterfactual machine learning model using the domain invariant representation. The computer system determines different maintenance thresholds for maintenance parameters for a metric in the set of metrics for performing maintenance on the part using the counterfactual machine learning model trained with the domain invariant representation. The computer system selects maintenance thresholds for the maintenance parameters from the maintenance thresholds meeting an objective while avoiding part anomalies. The selection of the inspirational parameters forms a maintenance plan. The maintenance plan is used to determine a maintenance action for the part.

In illustrative example, a "set of" as used with reference items means one or more items. For example, a set of metrics is one or more of the metrics.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112 and client computer 114. Client devices 110 can be, for example, computers, workstations, or network computers. In the depicted example, server computer 104 provides information, such as boot files, operating system images, and applications to client devices 110.

Further, client devices 110 can also include other types of client devices such as surface ship 116, mobile phone 118, rotorcraft 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

In this illustrative example, management of maintenance for client devices 110 such as surface ship 116 and rotorcraft 120 can be performed by platform manager 130 using counterfactual machine learning models 132. The management of maintenance by platform manager 130 includes at least one of identifying needed maintenance, scheduling maintenance, ordering components, coordinating resource allocation, or other operations performed to manage maintenance for at least one of surface ship 116 or rotorcraft 120.

In this illustrative example, platform manager 130 can train counterfactual machine learning models 132 using domain invariant representation 134 of historical sensor information 136 and historical maintenance events 138 for a part in rotorcraft 120. With this invariant representation of historical information for rotorcraft 120, platform manager 130 can train a counterfactual machine learning model in counterfactual machine learning models 132 to predict sensor information and maintenance events for rotorcraft 120. In other words, a counterfactual machine learning model can be trained to make predictions of sensor data and maintenance events for rotorcraft 120.

In this illustrative example, these predictions can be used to identify maintenance parameters 140 to form maintenance plan 142 for rotorcraft 120 for performing maintenance on the part for rotorcraft 120 with respect to sensor data for the part generated for the part. A maintenance parameter in maintenance parameters 140 is for a particular type of maintenance. For example, maintenance parameters 140 can include a parameter for inspection, preventative maintenance, corrective maintenance, and other types of maintenance.

With maintenance parameters 140, maintenance can be initiated for the part in rotorcraft 120. The maintenance triggered for the part using maintenance parameters 140 in maintenance plan 142 can be based on elapsed time since a prior maintenance was performed for part 216 in FIG. 2, changes in the part detected in sensor data, or a combination of the two. In this example, thresholds can be set as to when particular types of maintenance in maintenance parameters 140 are initiated or performed.

As result, maintenance can be performed in a manner that reduces undesired part performance more accurately than using scheduled maintenance plans. Further, by using maintenance plan 142, the expense for performing potentially unneeded maintenance on a part can be avoided.

This type of training of counterfactual machine learning models 132 to determine maintenance parameters 140 for maintenance plan 142 can be performed for any number of parts in rotorcraft 120. As another example, this type of determination of additional maintenance parameters for additional maintenance plans can also be performed for other vehicles such as surface ship 116. Each of these maintenance plans can be customized for a configuration of a particular vehicle or type of vehicle.

Although the illustrative example in FIG. 1 describes the management of client devices 110 such as surface ship 116 and rotorcraft 120, other types of client devices 110 can also be managed. For example, client devices 110 can also include a spacecraft, a building, or other suitable types of platforms for which maintenance can be managed. In the illustrative examples, this maintenance can also be extended to platforms in the form of data processing systems such as client computer 112, client computer 114, and smart glasses 122.

Figure 2:
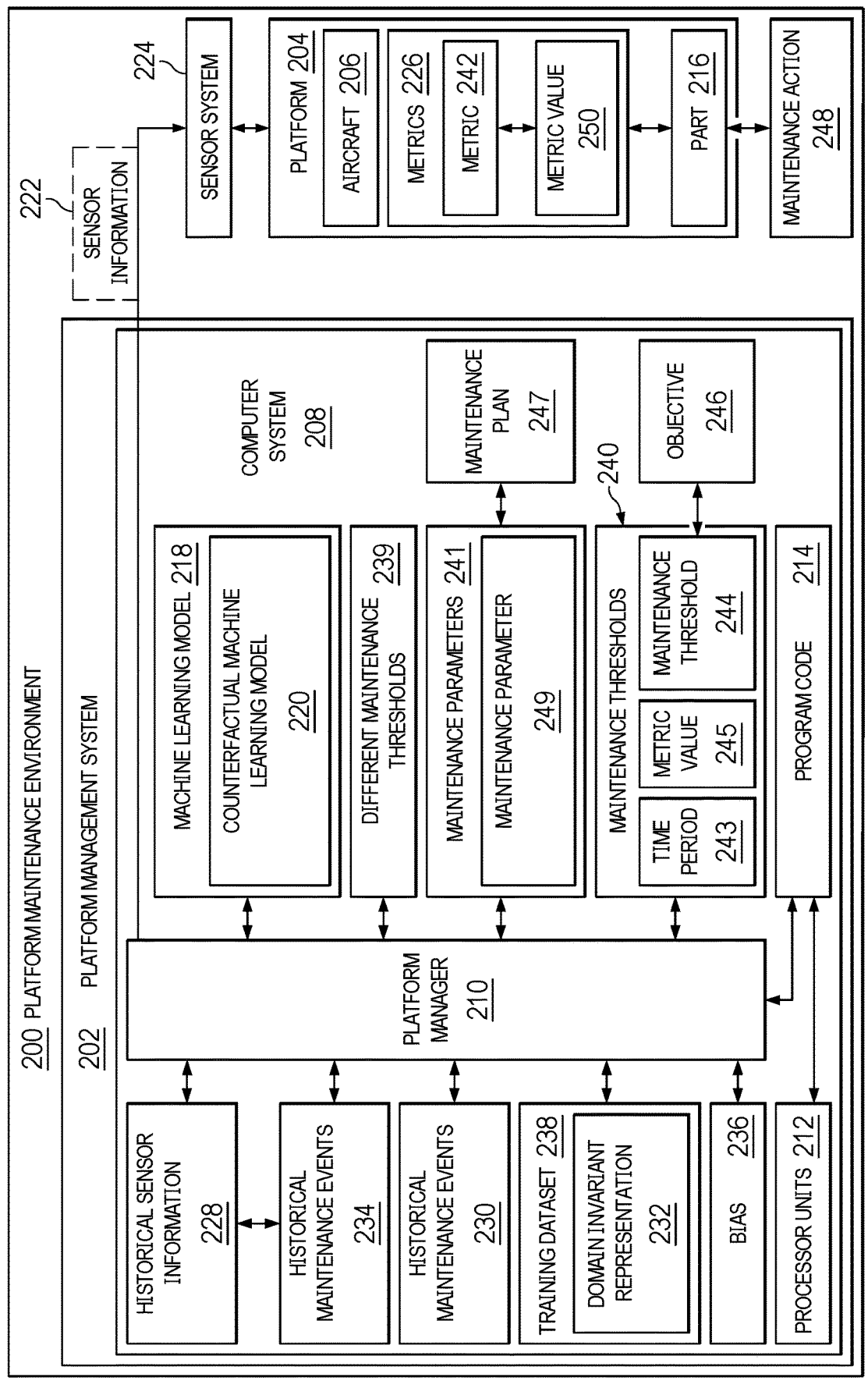
FIG. 2 is an illustration a block diagram of a platform maintenance environment in accordance with an illustrative embodiment.

With reference now to FIG. 2, an illustration a block diagram of a platform maintenance environment is depicted in accordance with an illustrative embodiment. In this illustrative example, platform maintenance environment 200 includes components that can be implemented in hardware such as the hardware shown in network data processing system 100 in FIG. 1.

As depicted, platform management system 202 can manage platform 204. This management can include, for example, managing maintenance for platform 204. In this illustrative example, platform 204 take the form of aircraft 206. Platform 204 can take a number of different forms in addition to aircraft 206. For example, platform 204 can be selected from a group comprising a mobile platform, a stationary platform, a land-based structure, an aquatic-based structure, a space-based structure, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other types of platforms.

In this illustrative example, platform management system 202 is comprised of a number of different components. As depicted, platform management system 202 comprises computer system 208 and platform manager 210. Platform manager 210 is located in computer system 208.

Platform manager 210 can be implemented in software, hardware, firmware, or a combination thereof. When software is used, the operations performed by platform manager 210 can be implemented in program code configured to run on hardware, such as a processor unit. When firmware is used, the operations performed by platform manager 210 can be implemented in program code and data and stored in persistent memory to run on a processor unit. When hardware is employed, the hardware can include circuits that operate to perform the operations in platform manager 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, computer system 208 includes a number of processor units 212 that are capable of executing program code 214 implementing processes in the illustrative examples. As used herein a processor unit in the number of processor units 212 is a hardware device and is comprised of hardware circuits such as those on an integrated circuit that respond and process instructions and program code that operate a computer. When a number of processor units 212 execute program code 214 for a process, the number of processor units 212 is one or more processor units that can be on the same computer or on different computers. In other words, the process can be distributed between processor units on the same or different computers in a computer system. Further, the number of processor units 212 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, platform management system 202 can manage maintenance for part 216 in platform 204 using machine learning model 218. In this illustrative example, part 216 can take a number of different forms. In the illustrative example, part 216 can be a single component, assembly, a system, or some suitable form. For example, part 216 can be a gearbox, a fairing, a landing gear assembly, a door, a skin panel, a display, a computer, an encoder, a sensor, a harness, an actuator, a fuel pump, and auxiliary power unit (APU), or some other type of part.

In this example, machine learning model 218 is counterfactual machine learning model 220. Counterfactual machine learning model 220 is a machine learning model that can provide output in the form of a "what if" feedback form. For example, if an input data point is x' instead of x, then counterfactual machine learning model 220 generates output of y' instead of y. Counterfactual machine learning model 220 can be implemented using a neural network, a recurrent neural network, a long short-term memory neural network, a gate recurrent unit neural network, convolutional recurrent neural network (CRN), and a Bayesian network.

Counterfactual machine learning model 220 can be implemented using other types of machine leaning models that can predict a sequence of values.

In this illustrative example, platform manager 210 can receive sensor information 222 from sensor system 224 for platform 204. Sensor information 222 comprises information for part 216 and can include information for other parts in platform 204. In this example, sensor information 222 for part 216 can be any sensor information that is relevant to monitoring the health of part 216.

In this illustrative example, sensor system 224 for platform 204 can generate sensor information 222 from monitoring platform 204. Monitoring can include detecting events or changes in the environment for platform 204. The changes in environment can be the environment around platform 204, within platform 204, or both around and within platform 204.

Sensor system 224 is a hardware system and can include software. Sensors and other components in sensor system 224 can be located in platform 204, exterior to platform 204, or a combination thereof.

The sensors in sensor system 224 can include at least one of an airflow meter, a speed sensor, a voltage detector, accelerometer, an altimeter, a gyroscope, an inertial navigation system, an inertial reference unit, a yaw rate sensor, an incremental encoder, a linear encoder, a position sensor, a tilt sensor, a pitot tube, an angle of attack (AOA) sensor, a fuel sensor, a temperature sensors, a pressure sensor, or other suitable types of sensors that can be used to generate sensor information 222. The other components in sensor system 224 can include processor units, computers, or other data processing devices that can process signals from sensors and generate sensor information 222. As result, sensor information 222 can include values for parameters measured for part 216, health information derived from measured parameters, and other suitable information that can be derived from sensor system 224 for part 216. Sensor information 222 can be for a set of metrics 226 for part 216. The set of metrics 226 comprises sensor information 222 that can be used to evaluate the health of part 216.

In this illustrative example, sensor information 222 for metrics 226 can be stored over time by platform manager 210 to form historical sensor information 228 for metrics 226. Further, platform manager 210 can also store historical maintenance events 230 for part 216. In this illustrative example, historical maintenance events 230 can be maintenance events performed for part 216. A maintenance event is an event in which maintenance action or operation is performed for a part. Historical maintenance events can include, for example, inspection, rework, replacement, or other types of maintenance actions for part 216.

As depicted, platform manager 210 can generate domain invariant representation 232 of historical metric values 234 from historical sensor information 228 for the set of metrics 226 and historical maintenance events 230. In this example, historical sensor information 228 can include other information in addition to historical values for metrics 226 of interest. A set of metrics 226 can be a subset of metrics 226.

In this illustrative example, bias 236 caused by historical maintenance events 230 can be reduced in domain invariant representation 232. Bias 236 can occur because it may be unclear whether historical maintenance events 230 caused changes to historical metric values 234 and historical sensor information 228 for a set of metrics 226 for part 216. For example, domain invariant representation 232 of historical metric values 234 and historical maintenance events 230 such that information loss with respect to historical metric values 234 is reduced and the information loss with respect to historical maintenance events 230 is increased resulting in reducing bias 236 caused by historical maintenance events 230 in domain invariant representation 232.

In this illustrative example, the domain invariant representation 232 forms training dataset 238. Platform manager 210 can train counterfactual machine learning model 220 using domain invariant representation 232. In another illustrative example, training dataset 238 can comprise historical metric values 234 and historical maintenance events 230. In this example, training dataset 238 does not include generating domain invariant representation 232 from historical metric values 234 and historical maintenance events 230.

After training, platform manager 210 can determine different maintenance thresholds 239 for maintenance parameters 241 for metric 242 in the set of metrics 226 for performing maintenance on part 216 using counterfactual machine learning model 220 trained with the domain invariant representation 232. Thus, each maintenance parameter can have multiple maintenance thresholds in different maintenance thresholds 239.

In this illustrative example, platform manager 210 can select maintenance threshold 244 from different maintenance thresholds 239 for maintenance parameter 249 in maintenance parameters 241 meeting objective 246. The selection of maintenance threshold 244 can be made for each maintenance parameter in maintenance parameters 241. In this manner, platform manager 210 can select maintenance thresholds 240 for maintenance parameters 241 from different maintenance thresholds 239 meeting objective 246 to form maintenance plan 247.

In this example, maintenance thresholds 240 are values for maintenance parameters 241 that are used to determine when maintenance is triggered. Maintenance thresholds 240 can be at least one of time period 243 or metric value 245. In other words, the passing of time period 243 specified as a maintenance threshold or a metric value for a metric in metrics 226 crossing a maintenance threshold can indicate the need for maintenance such as maintenance action 248.

For example, time period 243 can be the time that has passed or elapsed since a last maintenance was performed on part 216. With this example, time period 243 is a threshold with a value that indicates when maintenance should be performed based on the passing of time.

As another example, a metric value can be based on sensor data to indicate a metric such as a condition indicator for part 216. When the metric value crosses a threshold value such as rising above or decreasing below the threshold value, then maintenance can be performed. The type of maintenance performed is based on the maintenance parameter for which the threshold value is associated.

Maintenance action 248 can take a number of different forms. For example, maintenance action 248 for part 216 can be a part replacement, an inspection, routine maintenance, extensive maintenance, or some other suitable maintenance action.

Platform manager 210 selects maintenance thresholds 240 for maintenance parameters 241 which are used to determine when maintenance action 248 is needed. Maintenance parameters 241 with maintenance thresholds 240 form maintenance plan 247 for part 216.

This process can be performed for any number of metrics in metrics 226 to determine maintenance thresholds 240 for maintenance parameters 241 for the any number of metrics for part 216. In these illustrative examples, each maintenance parameter and maintenance parameters 241 can have a maintenance threshold in maintenance thresholds 240. Further, each metric can have maintenance parameters 241. Different metrics can have different maintenance parameters and maintenance parameters 241.

Additionally, the same maintenance parameter for different metrics can have different values for maintenance thresholds 240. The selection of metrics 226 can be based on metrics 226 that have been most effective for correspondence with respect to the performance of part 216. In other words, metrics 226 can be selected as those that are most likely to indicate whether part 216 will perform in or out of tolerance for determining whether maintenance action 248 is needed.

In this illustrative example, objective 246 can take a number of different forms. For example, objective 246 can be selected from a group comprising increased life part, reduced maintenance expense, increased time between maintenance, reducing part failure between maintenance events, increased maintenance free operating period (MFOP), increased mean time between failures (MTBF), increased mission success rate and other suitable types of objectives.

In this depicted example, maintenance threshold 244 is used to determine when maintenance action 248 is needed for part 216. In one illustrative example, platform manager 210 can monitor metric 242 for part 216 in platform 204. Monitoring of metric 242 can be performed by receiving sensor information 222 and comparing metric 242 in or derived from sensor information 222 to maintenance threshold 244 to determine whether maintenance action 248 is needed. Platform manager can initiate maintenance action 248 for part 216 when metric 242 crosses maintenance threshold 244. Metric 242 can cross maintenance threshold 244 by being greater than or less than maintenance threshold 244. In another illustrative example, maintenance threshold 244 can be considered to be crossed when maintenance threshold 244 is reached.

As another example, elapsed time since a last maintenance action for part 216 can be monitored by platform manager 210. This monitoring can be performed when, maintenance parameter 249 is an inspection in which maintenance threshold 244 is time period 243.

In another illustrative example, platform manager 210 can send maintenance plan 247 to platform 204. With this example, computer system in platform 204 can make the comparison between sensor information 222 for metric 242 to maintenance thresholds 240. Monitoring metric 242 can be in maintenance parameters 241 for maintenance plan 247. Platform 204 can also track elapsed time when one of maintenance parameters 241 is an inspection in which the associated maintenance threshold is time period 243.

As a result, with the use of maintenance thresholds 240 for maintenance parameters 241 in maintenance plan 247, maintenance action 248, or a combination thereof, can be performed for part 216 based on when maintenance may be needed rather than on a fixed schedule. In other words, maintenance thresholds 240 for maintenance parameters 241 for metric 242 can indicate when metric 242 has changed sufficiently to require maintenance action 248 for part 216.

Additionally, maintenance threshold 244 can indicate the amount of time that has elapsed since a prior maintenance to determine when maintenance action 248 should be performed. This type of "scheduled" maintenance is based on modeling of part 216 using counterfactual machine learning model 220 and not the traditional rigid scheduling of maintenance.

Further, maintenance threshold 244 can be fine-tuned or refreshed periodically or continuously. For example, as sensor information 222 continues to be received from sensor system 224 for platform 204, this additional sensor information can be used to further train counterfactual machine learning model 220. With this additional training, refinements can be made in selecting maintenance threshold 244. In other words, with continuing to receive sensor information 222, a feedback loop can be generated to further train counterfactual machine learning model 220 and to refine or reselect maintenance threshold 244.

As another example, time period 243 can change over time in response to changes to platform 204. For example, changes to at least one of the configuration of platform 204, the supplier of part 216, the age of platform 204, or other changes can result in a change in time period 243 used for maintenance parameter 249 for maintenance plan 247 for part 216.

The selection of maintenance thresholds 240 for maintenance parameters 241 for metric 242 can be performed for other metrics in a set of metrics 226 for part 216. Maintenance thresholds 240 for maintenance parameters 241 can be determined for metrics 226 for other parts within platform 204.

Figure 3:
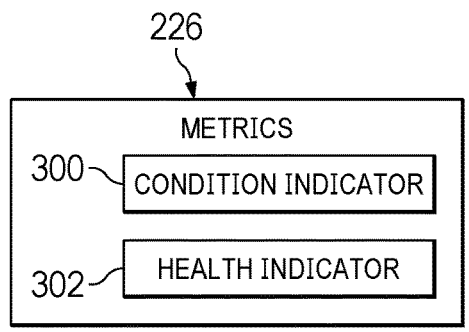
FIG. 3 is an illustration of metrics in accordance with an illustrative embodiment.

With reference next to FIG. 3, an illustration of metrics is depicted in accordance with an illustrative embodiment. In the illustrative examples, the same reference numeral may be used in more than one figure. This reuse of a reference numeral in different figures represents the same element in the different figures.

The set of metrics 226 can take a number of different forms. For example, the set of metrics 226 can be selected from at least one of a condition indicator, sensor data, raw sensor data, processed sensor data, or other types of data that can be used to determine platform health.

In this illustrative example, metrics 226 can take a number of different forms. As depicted, metrics 226 comprises at least one of condition indicator 300 or health indicator 302.

Condition indicator 300 is a feature whose behavior changes in a predictable way for part 216 such as a component or multiple components that deteriorate or operate in different operational modes. The condition indicator can be used to distinguish abnormal operations from normal operations and can be used to predict remaining useful life of a set of components. In this illustrative example, condition indicator 300 can be obtained from processing sensor data and can be selected to indicate the presence of an abnormal condition of part 216 that can lead to a degradation in performance of part 216 such that part 216 may no longer operate at a desirable level. This desired level of performance can be based on tolerances set by various sources such as a manufacturer, regulation, regulatory agency, industry standard, or other suitable source that can be used to determine or specify tolerances for acceptable performance for part 216.

For example, condition indicator 300 can be a measure of torsional vibrations in a driveshaft in a drivetrain in pulses per revolution. Another condition indicator can be accelerometer readings in inches per second for a hanger bearing in the drive train. In yet another example, condition indicator 300 can be accelerometer readings for a driveshaft in a drivetrain. These different types of readings can be used to as condition indicators for the state of a component such as a drivetrain.

As another example, for a fixed axis gearbox, condition indicators be for features using data from sensors such as accelerometers. The condition indicators can be a sideband index (SI), a sideband level factor (SLF), a crest factor (CF), and an energy ratio (ER).

Health indicator 302 indicates the health of part 216. Health indicator 302 can be based on one or more condition indicators. For example, health indicator 302 for part 216 in the form of a fixed axis gear box can be based on condition indicators such as the sideband index (SI), the sideband level factor (SLF), the crest factor (CF), and the energy ratio (ER).

Figure 4:
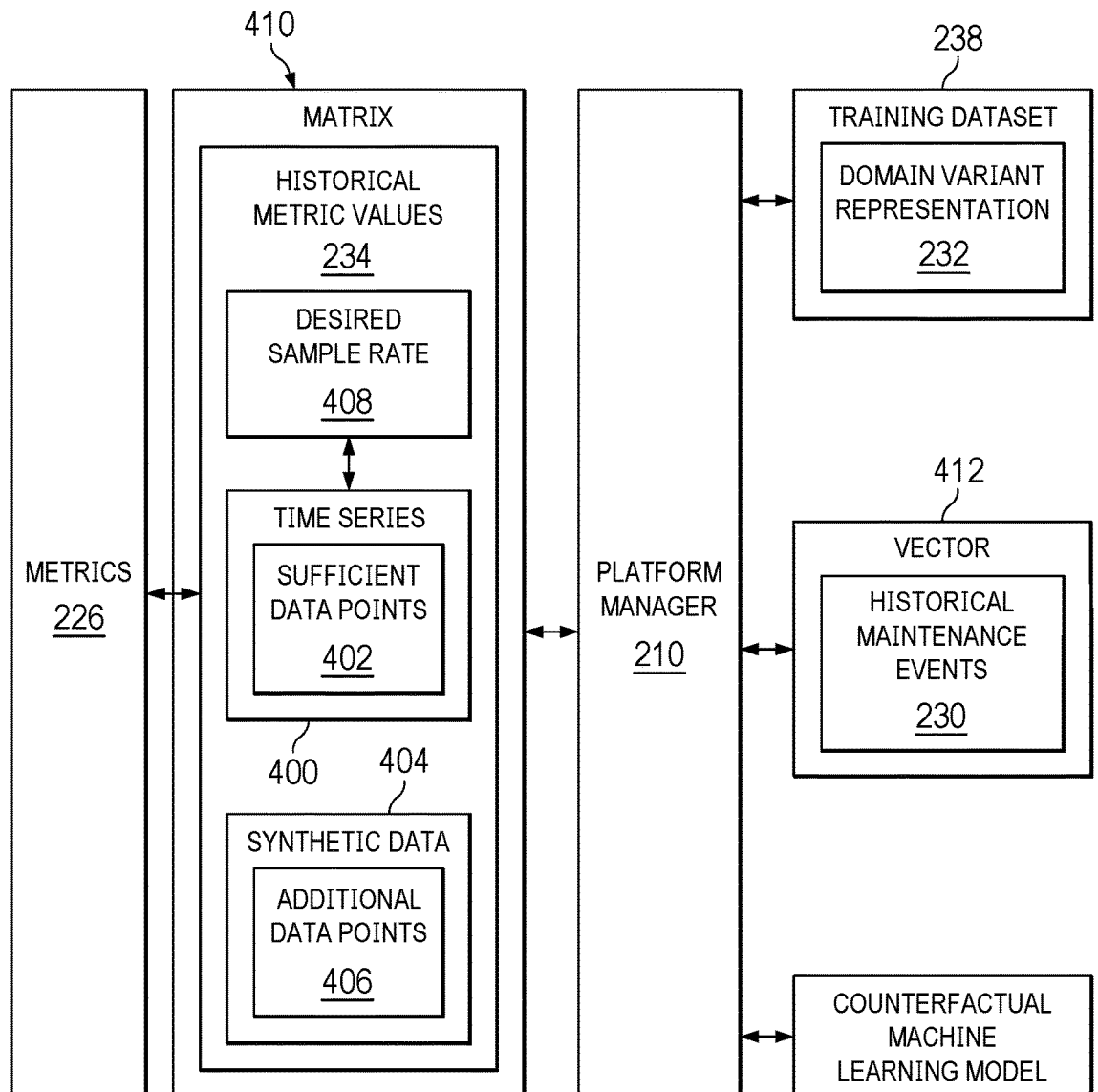
FIG. 4 is an illustration of a block diagram for creating a training dataset in accordance with an illustrative embodiment.

Turning next to FIG. 4, an illustration of a block diagram for creating a training dataset is depicted in accordance with an illustrative embodiment. In training counterfactual machine learning model 220, platform manager 210 uses historical sensor information 228 and historical maintenance events 230 to generate domain invariant representation 232 to form training dataset 238.

Platform manager 210 obtains historical metric values 234 from historical sensor information 228. In this example, historical metric values 234 for set of metrics 226 takes the form of time series 400. In other words, historical metric values 234 are data points obtained at successive times and can be with equal intervals between data points. Historical metric values 234 can be present in historical sensor information 228 or can be derived from historical sensor information 228.

In this example, time series 400 can contain data points for multiple metrics in set of metrics 226. In this example, although historical metric values 234 can be for multiple metrics, counterfactual machine learning model 220 predicts future metric values for a single metric.

In this example, platform manager 210 can determine whether sufficient data points are is present in time series 400. If platform manager 210 determines that sufficient data points 402 are absent in time series 400 for historical metric values 234, platform manager 210 can generate synthetic data 404 to add additional data points 406 to time series 400 for historical metric values 234. For example, gaps in data can be present within time series 400. The addition of additional data points 406 in synthetic data 404 can provide desired sample rate 408 for time series 400.

When sufficient data is present in time series 400, platform manager 210 can generate domain invariant representation 232 for training dataset 238. In this example, domain invariant representation 232 can be generated using matrix 410 containing historical metric values 234 and vector 412 containing historical maintenance events 230.

As depicted, matrix 410 contains time series 400 of historical metric values 234. For example, matrix 410 can be a n×k matrix. With this implementation, n is the number of observations and k is the number of metrics 226. In this example, each row corresponds to a metric in a set of k metrics. The row for a metric contains historical metric values for that metric. In other words, historical metric values 234 for a set of metrics 226 are stored in matrix 410 having n historical metric values for k metrics.

In this illustrative example, historical metric values 234 in matrix 410 can be normalized. For example, historical metric values 234 can be normalized to be a value between from 0 to 1.0.

In this illustrative example, historical maintenance events 230 are stored in vector 412. Vector 412 contains maintenance events corresponding to the historical metric values 234 in matrix 410. For example, the second entry for a maintenance event in vector 412 corresponds to the same time for the second values for historical metric values 234 in the rows for the different metrics. In other words, each column in matrix 410 corresponds to an entry in vector 412.

In this illustrative example, each entry in vector 412 can take a number of different forms. For example, each entry can be a binary value in which a "0" indicates no maintenance event while a "1" indicates a maintenance event. As another example, each entry can contain an integer in which a "0" represents no maintenance event, a "1" represents a corrective maintenance with part replacement, and a "2" represents preventative maintenance, and a "3" represents an inspection. If two types of maintenance occur for a time instance these two types of maintenance can be represented as follows "x.y" where "x" is a first integer for a first type of maintenance and "y" is a second manager for a second type of maintenance. For example, an inspection and a preventative maintenance is represented as "3.2" in this example.

Domain invariant representation 232 is generated in an illustrative example to take into account situations where the correlation to metric values and maintenance events may not always correlate as much as desired. For example, although the entries in vector 412 for historical maintenance events 230 correlate to the matrix entries in the rows in matrix 410, it may be unclear as to exactly when a historical maintenance event occurred with respect to the historic metric values 234. Further, if more than one type of maintenance event can occur, it may be unclear what maintenance event did occur.

Additionally, other reasons may cause a historical metric value to change other than a historical maintenance event. For example, a change in location for a mission parameter can cause a change in a historical metric value.

Thus, historical metric values 234 and historical maintenance events 230 can be taken as input for creating domain invariant representation 232 for use as training dataset 238.

In this illustrative example, domain invariant representation 232 can model the input space in a manner that reduces or minimizes information loss with respect to historical metric values 234 and increases or maximizes information loss with respect to historical maintenance events 230. This type of representation can remove bias 236 that can be inherently present in historical maintenance events 230. In this example, the source domains are maintenance events and metric values. The use of these two source domains can be generalized to unseen target domains.

In this illustrative example, platform manager 210 can use various currently available domain generalization techniques for generating domain invariant representations of information from multiple sources. For example, domain generalization techniques that can be used to generate domain invariant representation 232 to include domain alignment, meta-learning, data augmentation, ensemble learning, and other suitable techniques for domain generalization that can be used to generate domain invariant representation 232 using historical maintenance events 230 and historical metric values 234. Platform manager 210 can then train machine learning model 218 using domain invariant representation 232.

Figure 5:
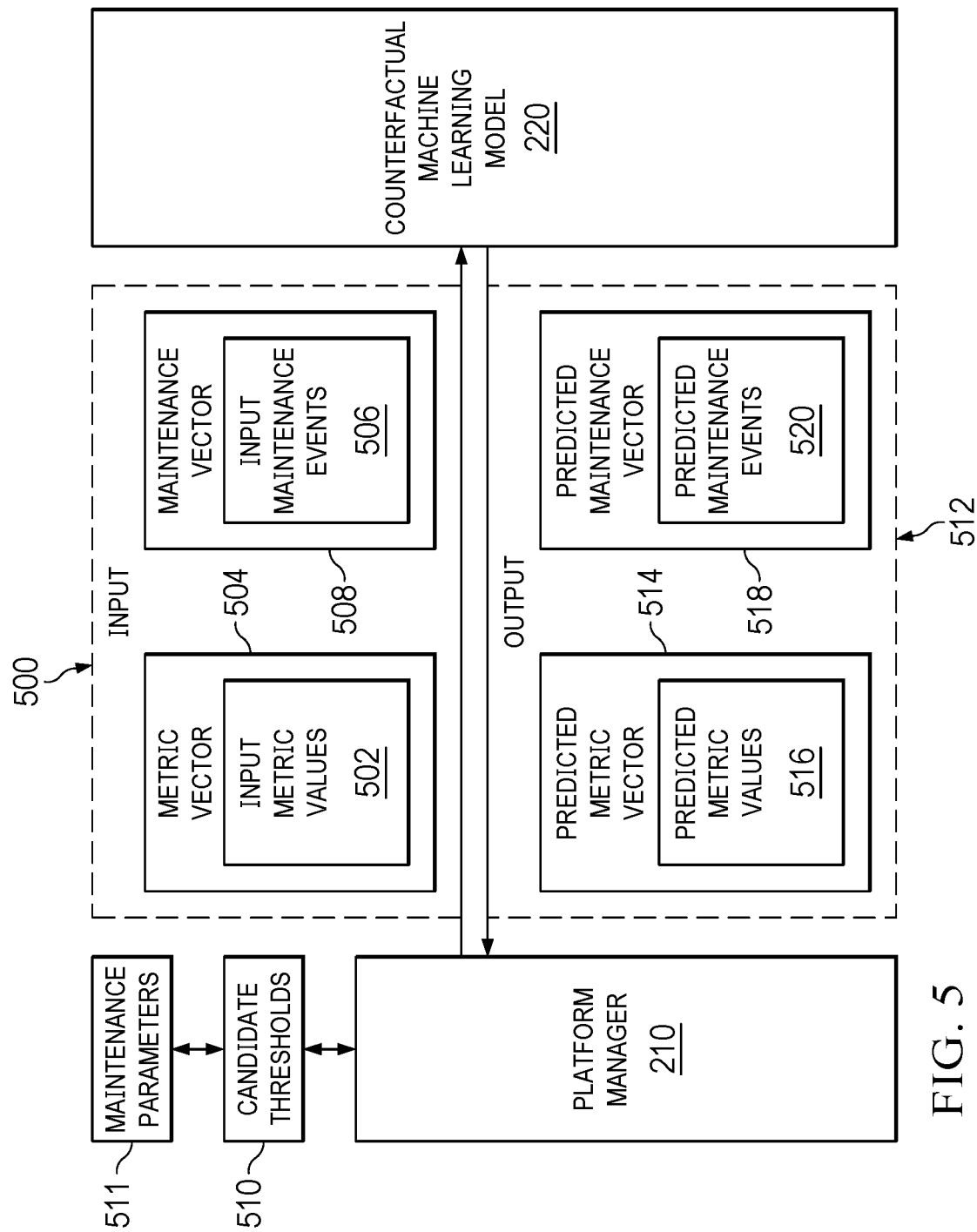
FIG. 5 is an illustration of a block diagram for using a counterfactual machine learning model to generate predicted metric values in accordance with an illustrative embodiment.

Turning next to FIG. 5, an illustration of a block diagram for using a counterfactual machine learning model to generate predicted metric values is depicted in accordance with an illustrative embodiment. After training, counterfactual machine learning model 220 can be used to predict metric values and maintenance events. These predictions can in turn be used to generate maintenance thresholds 240 from which maintenance threshold 244 can be selected for metric 242 for part 216.

For example, platform manager 210 can generate input 500. In this example, input 500 comprises input metric values 502 in metric vector 504 and input maintenance events 506 in maintenance vector 508. In this illustrative example, input metric values 502 are selected as example of values that can be present in a particular example or scenario. Input maintenance events 506 and maintenance vector 508 are generated based on input metric values 502 and candidate thresholds 510 for maintenance parameters 511. Thus, a maintenance event in maintenance vector 508 has value based on the value of the corresponding input metric value in metric vector 504.

For example, input metric values 502 can be values for condition indicators in metric vector 504 can be as follows: [0.34, 0.38, 0.8, 0.7, 0.1, 0.2]. In this example, candidate thresholds 510 can be 0.75 for corrective maintenance and 0.6 for preventative maintenance in maintenance parameters 511. With this value for candidate threshold 510, maintenance events 506 in maintenance vector 508 are [0, 0, 2, 1, 0, 0].

In maintenance vector 508, a "0" means no maintenance event has occurred while a "1" indicates a maintenance event such as preventative maintenance is present when an input metric value in metric vector 504 is greater 0.6 but less than 0.75. In this example, "2" indicates a maintenance event such as corrective maintenance is present in maintenance vector 508 when an input metric value in metric vector 504 is greater than 0.75. In this example, correlation is present between condition indicators and maintenance events based on the selected threshold that is to be used.

Platform manager 210 sends input 500 into counterfactual machine learning model 220 which has been trained using domain invariant representation 232. In response to receiving metric vector 504 and maintenance vector 508, counterfactual machine learning model 220 generates output 512. In this example, output 512 comprises predicted metric vector 514 containing predicted metric values 516 and predicted maintenance vector 518 containing predicted maintenance events 520.

For example, metric vector 504 is a condition indicator (CI) vector for a condition indicator as follows [0.34, 0.38, 0.8, 0.7, 0.1, 0.2]. In this example, maintenance vector 508 is a maintenance (Mx) vector as follows [0, 0, 2, 1, 0, 0] for candidate thresholds 510 being and 0.75 in input 500. In response to input 500, predicted metric values 516 for predicted metric vector 514 and predicted maintenance events 520 in predicted maintenance vector 518 in output 512 can be made.

In this example, the prediction in output 512 is a sequence-to-sequence prediction for another sequence of condition indicators values and maintenance events. In this example, output 512 of the one step ahead prediction is used in the input of the two step ahead prediction along with the thresholds 06. and 0.75. The new values of predicted maintenance vector 518 are determined from the new values in predicted metric vector 514.

Predicted metric values 516 for predicted metric vector 514 and predicted maintenance events 520 in predicted maintenance vector 518 in output 512 can be the original input data with no predictions. In this example, one maintenance parameter is inspection. The maintenance threshold for inspection is a time period in this example. Inspection rate r is 80 hours and each flight is 20 hours. With this example, an inspection occurs every 4 steps.

In this depicted example, the corrective maintenance threshold for a corrective maintenance parameter is $\tau_C=0.8$. Preventative maintenance threshold for a preventative maintenance parameter $\tau_P=0.6$.

In this example, the condition indicator (CI) vector at zero steps is [0.8, 0.1, 0.1, 0.2] and the maintenance (Mx) vector is [2, 0, 0, 0]. At step zero corrective maintenance is performed.

At one step ahead, the CI vector is [0.1, 0.1, 0.2, 0.4] and the Mx vector is [0, 0, 0, 0]. At two steps ahead, the CI vector is [0.1, 0.2, 0.4, 0.55] and the Mx vector is [0, 0, 0, 0]. The CI vector is [0.2, 0.4, 0.55, 0.68] and the Mx vector is [0, 0, 0, 3.1] at three steps ahead.

At four steps ahead, the CI vector is [0.4, 0.55, 0.68, 0.5] and the Mx vector is [0, 0, 3.1, 0] The CI vector is [0.55, 0.68, 0.5, 0.7] and the Mx vector is [0, 3.1, 1, 0] at five steps ahead. At six steps ahead, the CI vector is [0.68, 0.5, 0.7, 0.9] and the Mx vector is [3.1, 0, 0, 2].

In this example, corrective maintenance occurs at 0 steps ahead and then at 3 steps ahead an inspection results in preventative maintenance because the value 0.68 is above the preventative maintenance threshold. These two maintenance events for the time instance are represented as "3.1", wherein "3" is for the inspection and "1" is for the preventative maintenance.

At six steps ahead, corrective maintenance occurs from the CI value passing the corrective maintenance threshold Tc.

This process of generating input 500 and obtaining output 512 can be performed for each maintenance threshold in maintenance thresholds 240. Output 512 for the different maintenance thresholds can then be analyzed to determine which candidate threshold best meets objective 246. That candidate threshold is then selected as maintenance threshold 244 for metric 242 for part 216.

Figure 6:
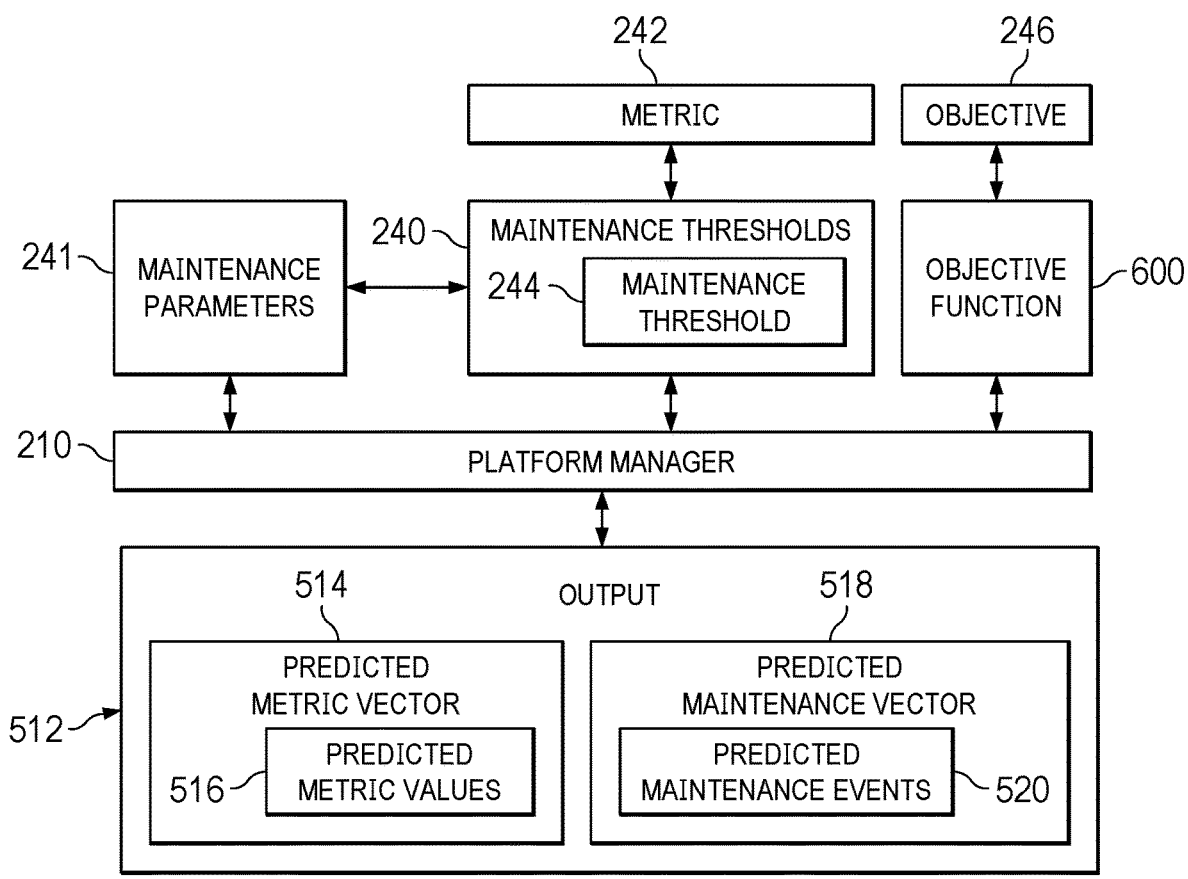
FIG. 6 is illustration of a block diagram for creating a maintenance plan for a metric in accordance with an illustrative embodiment.

With reference now to FIG. 6, illustration of a block diagram for creating a maintenance plan is depicted in accordance with an illustrative embodiment. The generation of predicted metric values 516 for predicted metric vector 514 and predicted maintenance events 520 in predicted maintenance vector 518 can be in output 512 for different maintenance parameters in maintenance parameters 241 with different thresholds in maintenance thresholds 240. The platform manager 210 can use output 512 to identify maintenance threshold 244 from maintenance thresholds 240 for metric 242 that meets objective 246. In this illustrative example, maintenance threshold 244 can best meet objective 246 as compared to other maintenance thresholds in maintenance thresholds 240.

Platform manager 210 can define objective function 600 for objective 246 that considers the counterfactual reality in output 512 in which maintenance parameters 241 are assigned maintenance thresholds in creating maintenance plan 247 for part 216.

For example, an objective can be to maximize the return time before another maintenance action is needed. With this example, objective function 600 can be function F(M). In this example, M are maintenance parameters 241 that each have a maintenance threshold. These maintenance thresholds for maintenance parameters 241 can be selected to reach objective 246 for objective function 600. For example, when maintenance parameters 241 comprises inspection (r), preventative maintenance $\tau P$), and corrective maintenance ($\tau C$), objective function 600 can be a cost function F(r,$\tau$P, $\tau$C,Xcounter) that uses a counterfactual prediction. These values can be obtained from making a counterfactual prediction using counterfactual machine learning model 220 to generate output 512.

With this example, objective function 600 is used to reach objective 246, which is to minimize the cost of regular inspections, the cost of preventive maintenance resulting from inspection, and the cost of corrective maintenance occurs due to a part being out of tolerance. As the rate of inspection occurs, a cost is incurred by the frequency of inspections. However, with increased inspections, the probability of corrective maintenance can be reduced.

In this illustrative example, objective function 600 can take the form of a cost function as follows:

$F(r,\tau P,\tau C,X)=Cr(T/r)+CPPr(pMx|\tau P)+CCPr(cMx|\tau C)$ where Cr is the cost of each inspection, CP is the cost of preventive maintenance, CC is the cost of corrective maintenance, and X is the condition indicator time series data. The events pMx and cMx refer to the occurrence of preventive and corrective maintenance events, respectively. In this example, the selection of maintenance thresholds 244 for maintenance parameters 241 is made using the cost function such that the cost for maintenance is reduced or minimized.

With the selection of maintenance thresholds 240, sensor information 222 generated by sensor system 224 can be used to monitor part 216 in platform 204. In particular, metric 242 can be monitored to determine whether metric value 250 crosses any of maintenance thresholds 240. When metric value 250 crosses one or more of maintenance thresholds 240, then maintenance action 248 can be initiated for part 216.

In one illustrative example, one or more solutions are present that overcome a problem with reactionary or scheduled maintenance. As a result, one or more technical solutions can provide a technical effect of selecting maintenance thresholds for parts in a platform that reduces the cost of maintenance and reduces the time that a vehicle may be out of service. With the use of maintenance thresholds 240 for maintenance parameters 241 to create maintenance plan 247 for metric 242 for part 216 in platform 204, a reactionary maintenance schedule can be avoided in which platform 204 is essentially out of service while replacement parts and maintenance operations are requested, ordered, then delivered into the field. Further, the use of maintenance plan 247 for part 216 can provide more lead time for scheduling performance before an undesired anomaly occurs in part 216 that may cause part 216 to no longer work within the tolerance for desired performance.

Computer system 208 can be configured to perform at least one of the steps, operations, or actions described in the different illustrative examples using software, hardware, firmware, or a combination thereof. As a result, computer system 208 operates as a special purpose computer system in which platform manager 210 in computer system 208 enables selecting maintenance thresholds for parts in a manner that takes into account both historical metric values and historical maintenance events. Further, the illustrative examples also reduce a bias with respect to historical maintenance events to take into account that historical maintenance events may not cause changes in the historical metric values. In particular, platform manager 210 transforms computer system 208 into a special purpose computer system as compared to currently available general computer systems that do not have platform manager 210.

The illustration of platform maintenance environment 200 in the different components in platform maintenance environment 200 in FIGS. 2-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform manager 210 a shown as a separate component outside of platform 204, platform manager 210 can be implemented in a computer system in platform 204 in some illustrative examples.

In yet another illustrative example, machine learning model 218 may not take the form of counterfactual machine learning model 220. Machine learning model 218 can be implemented using machine learning model architectures that enable predicting a series of events in the future in response to training based on historical information such as historical metric values and historical maintenance.

Further, the use of domain invariant representation 232 may not be needed in some illustrative examples when sufficient information about historical maintenance events 230. The information can include when historical maintenance events occurred with a desired level of accuracy, determining whether other factors may cause changes in historical metric values 234 other than historical maintenance events, and other suitable commission.

As another example, maintenance thresholds 240 are described as being selected for values of metric 242. The selection of maintenance thresholds 240 for maintenance parameters 241 can be performed for many different metrics for part 216. As another example, historical sensor information 228 for the set of metrics 226 and historical maintenance events 230 can be received from a set of platforms in addition to or in place of platform 204. With this example, the set of platforms can be selected to be of the same type or model, the same or similar configuration, use the same part type, or have other similarities that enable generating training dataset 238 for training machine learning model 218 to have a desired level of accuracy.

Figure 7:
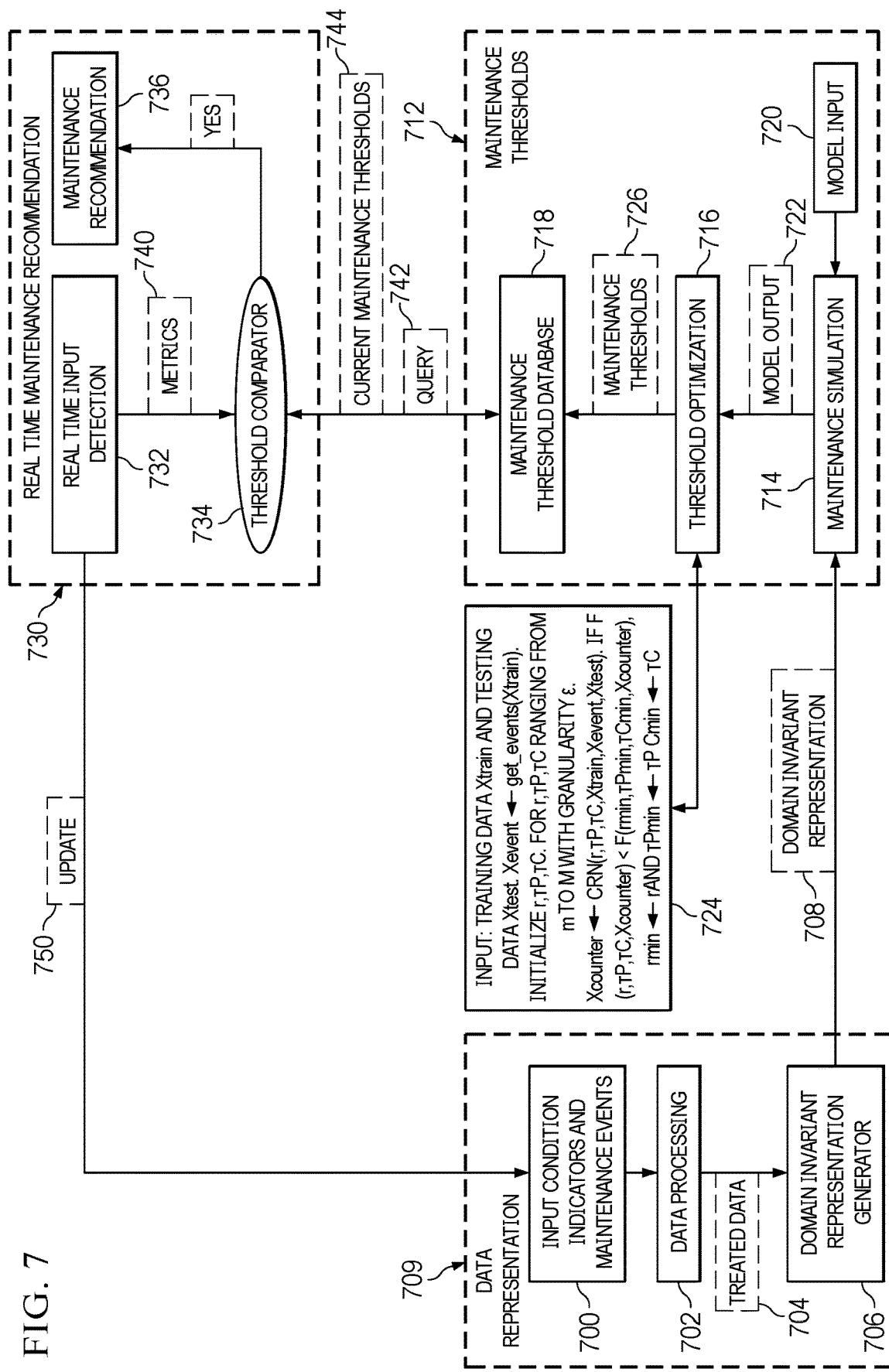
FIG. 7 is an illustration of a flowchart of a process for managing maintenance for a vehicle in accordance with an illustrative embodiment.

Turning now to FIG. 7, an illustration of a flowchart of a process for managing maintenance for a vehicle is depicted in accordance with an illustrative embodiment. In this illustrative example, the process illustrated can be used to determine maintenance thresholds for an aircraft such as a rotorcraft. Further, the metrics used in this example are condition indicators.

In this example, input condition indicators and maintenance events 700, data processing 702, and domain invariant representation generator 706 represent blocks in which data representation 709 of information occurs for use in training a machine learning model. In this illustrative example, input condition indicators and maintenance events 700 is an input that comprises condition indicator values as a time series for each vehicle. Additionally, these condition indicators can include maintenance events. Maintenance events can be dates and descriptions of the types of maintenance. For example, the type of maintenance can be a part number for placement, a log entry for opportunistic maintenance, or other type of information. In this illustrative example, various condition indicators can be present input condition indicators and maintenance events 700. The training, however, the machine learning model results in predicting one condition indicator in this example.

When input condition indicator values are received, these condition indicators may not have a fixed sampling rate. Although the condition indicator values for the condition indicators can be represented as a time series, the temporal distance between two adjacent data points the time series may not be fixed. Further, the total number of data points in each time series for condition indicator can also be smaller than desired. For example, only hundreds of data points may be present.

With these conditions, data processing 702 can generate synthetic data to expand the time series. The expansion can be made under the assumption that samples are normally distributed at each point in time.

In this illustrative example, data processing 702 can calculate a rolling mean and standard deviation and sample from the corresponding normal distribution to fill gaps in the time series a desired sample rate. This desired sample rate can be, for example, 0.1 flight hours for an aircraft. In other words, if an aircraft is actually operating for 300 flight hours, the number of data points in the time series corresponding to each condition indicator can be 3000 with a sampled condition indicator value for each and 0.1 of flight hours.

Further, data processing 702 can also transform maintenance data into a vector. Each entry in this vector corresponds to the condition indicator value in the time series for the condition indicators. These time series or multiple condition indicators can be placed into a two-dimensional matrix X. This two-dimensional matrix can be a n×k matrix in which n columns are present for observations and k rows are present for the number of condition indicators in matrix X. With this example, the maintenance vector M can have a length of n. With this example, each entry corresponds to a column in matrix X. The matrix and the vector form treated data 704 which is sent to domain invariant representation generator 706. In this example, the condition indicator values in matrix X and the maintenance events in vector M are used as inputs by domain invariant representation generator 706 to generate domain invariant representation 708. In this example, domain invariant representation 708 models the input space in a manner that reduces information loss with respect to condition indicators while maximizing input loss with respect to maintenance events. This type of modeling in domain invariant representation 708 generated by domain invariant representation generator 706 reduces a bias that can be inherent in the history of maintenance events in vector M. This bias can come from various sources such as an in accuracy or uncertainty as to when a maintenance event occurred in time. As another example, bias can occur when the change in a condition indicator value in matrix X is caused by another source other than a maintenance event in vector M. For example, and environmental condition, and operating location, or a particular maneuver can cause a change in a condition indicator value.

Maintenance thresholds 712 includes maintenance simulation 714, threshold optimization 716, and maintenance threshold database 718. These components are used to identify a maintenance threshold for use in determining whether a maintenance action is needed for a part in a vehicle.

As depicted, domain invariant representation 708 is sent to maintenance simulation 714. This example, maintenance simulation 714 can be performed using a machine learning model such as a neural network. In one example, the neural network can be a recurrent neural network. Domain invariant representation 708 is training data to train the machine learning model to predict condition indicator values and maintenance events. In this example, these predictions can be counterfactual predictions when the recurrent neural network is a counterfactual recurrent neural network.

After training, model input 720 can be sent to the machine learning model to generate model outputs 722. In this example, model input 720 comprises values for condition indicators and maintenance. In this illustrative example, the input can be condition indicator matrix X for condition indicator values for one or more condition indicators and a maintenance vector M for maintenance events.

The condition indicator values can be selected for different changes in the performance of a part. In this illustrative example, the maintenance events in maintenance vector M can be generated based on maintenance thresholds for maintenance parameters for a particular condition indicator. In other words, the maintenance thresholds for maintenance parameters are selected, and the maintenance thresholds are compared to condition indicator values in condition indicator matrix X for the particular condition indicator of interest. The values in maintenance vector M are selected based on whether the condition indicator values are above the maintenance threshold in this example.

For example, if a preventative maintenance parameter has a maintenance threshold of 0.7 and a corrective maintenance parameter has a maintenance threshold of 0.82, these maintenance thresholds can be compared to the condition indicator values. If a condition indicator value is greater than 0.7 but less than 0.82, an entry in the corresponding time instance in the event vector can be a "1" for the preventative maintenance parameter. If the condition indicator value is greater than 0.82, then entry for the corresponding time instance in the event vector can be a "2" for the corrective maintenance parameter.

Additionally, inspections can also be included in the event vector that are not based on the condition indicator. For example, a "3" can in the event vector when the time period for the inspection maintenance threshold has elapsed. For example, each entry in the event vector is 1 day and the time period for inspections is 5 flights, then a "3" can be present every five flights in the event vector.

As a further example, if a time instance in the event vector is an inspection and the condition indicator value crosses a threshold, these maintenance parameters can be identified in the event vector. For example, if the condition indicator value is 0.9 and inspection is to be performed at the same time instance, the value in the event vector can be "3.2".

In this depicted example, when the condition indicator value is greater than the maintenance threshold, then a maintenance action needed. In this manner, a simulation of maintenance events that have not actually occurred can be performed using the machine learning model having a counterfactual feature.

In this illustrative example, model input 720 can comprise matrices and vectors for a plurality of maintenance thresholds. In one illustrative example, the same condition indicator matrix X can be used with different maintenance vectors M reflecting different thresholds. In another illustrative example, the condition indicator matrices can also vary as the maintenance thresholds vary. As result, model output 722 comprises predicted outputs for condition indicator matrix X and maintenance vectors Ms.

As depicted, model output 722 is sent to threshold optimization 716. Threshold optimization 716 analyzes the predictions in model output 722 to identify maintenance thresholds for maintenance parameters that best meets an objective. For example, threshold optimization 716 can determine the cost using model output 722. This cost can be compared to other costs for simulations performed for other maintenance thresholds. The maintenance thresholds having the lowest cost are selected based on this type of analysis.

In one illustrative example, threshold optimization 716 can use the potential maintenance values and calculate an objective function over different combinations of potential maintenance thresholds. The maintenance thresholds for the maintenance parameters that maximizes or best meets an objective can be selected as the maintenance thresholds for the maintenance parameters for use in determining when maintenance actions are needed for the part. In this illustrative example, the objective can be the overall cost for maintenance of a part during a period of time such as a month, a year, or the overall life of the part.

In this illustrative example, model output 722 from maintenance simulation 714 is used to analyze the counterfactual prediction for a particular combination of maintenance thresholds for maintenance parameters in model output 722. As depicted, threshold optimization 716 can implement a process in pseudocode 724 to select maintenance thresholds for maintenance parameters in a maintenance plan. As depicted, the process for pseudocode 724 selects a collection of covariant condition indicators for a part. The process then selects a condition indicator C from the collection.

The process for pseudocode 724 generates an event vector $X_{event}$ corresponding to the training data $X_{train}$ which indicates inspections, preventative maintenance, and corrective maintenance. This event vector is generated using training data. The event data can include can ground truth maintenance in the training data.

The process for pseudocode 724 makes a counterfactual prediction $X_{counter}$ using the counterfactual machine learning model CRN(r,τP,τC,$X_{train}$,$X_{event}$,$X_{test}$) with training data $X_{train}$ and an event vector $X_{event}$ as input with a set of possible parameters r, τP, τC. The event vector $X_{event}$ can be used as an input with metric vector to the counterfactual machine learning model. This counterfactual prediction can be performed for maintenance thresholds for the maintenance parameters τ, τP, and τC in which the candidate values for these thresholds can range from m to M in which the value changes by E. Each change can be used to generate a new input to the counterfactual machine learning model such that an output is received with a predicted metric vector and predicted maintenance vector for each combination of maintenance thresholds for the maintenance parameters.

The process for pseudocode 724 finds the maintenance thresholds that minimizes the cost for the objective function $F(r, \tau P, \tau C, X_{counter})$. The cost is determined from the output of the counterfactual machine learning model. If the cost is less then the cost using the current candidate maintenance thresholds, these maintenance thresholds are used as the current candidate maintenance thresholds. This process is repeated for the different possible combinations of maintenance thresholds for the maintenance parameters to identify the maintenance thresholds that minimize the objective function.

The identified maintenance thresholds for the maintenance parameters are then sent as maintenance thresholds 726 for storage in maintenance threshold database 718. Maintenance threshold database 718 stores maintenance thresholds for the maintenance parameters for different parts in one or more vehicles.

Next, real time maintenance recommendation 730 is used to determine when maintenance actions are needed. As depicted, real time maintenance recommendation 730 comprises real time input detection 732, threshold comparator 734, and maintenance recommendation 736.

In this illustrative example, real time input detection 732 detects condition indicator values during the operation of the vehicle in real time. These condition indicator values can be received from the sensor system. Real time input detection 732 can also track elapsed time since a last maintenance. The condition indicators values and the elapsed time are metrics 740.

As depicted, metrics 740 are sent to threshold comparator 734. In this illustrative example, threshold comparator 734 sends query 742 to maintenance threshold database 718 to obtain current maintenance threshold 744 for a condition indicator of interest. In this illustrative example, current maintenance thresholds 744 is compared to metrics 740 to determine whether any of the current maintenance thresholds 744 have been crossed.

If one of current maintenance thresholds 744 has been crossed, threshold comparator 734 issues maintenance recommendation 736 for a maintenance action based on which maintenance threshold was crossed. Maintenance recommendation 736 is an example of a maintenance action.

Each maintenance threshold for a condition indicator is associated with the particular maintenance parameter. If more than one threshold is crossed, the maintenance for the maintenance parameter associated with the highest maintenance threshold that is crossed can be included in maintenance recommendation 736.

Maintenance recommendation 736 is sent to at least one of a maintenance system, a human operator, the maintenance facility, or other suitable target for initiating a maintenance action.

Additionally, real time input detection 732 can also send update 750 for use as values for input condition indicators in input condition indicators and maintenance events 700. In this manner, the new condition indicator values for condition indicators can be used for updating or additional training of the machine learning model.

Figure 8:
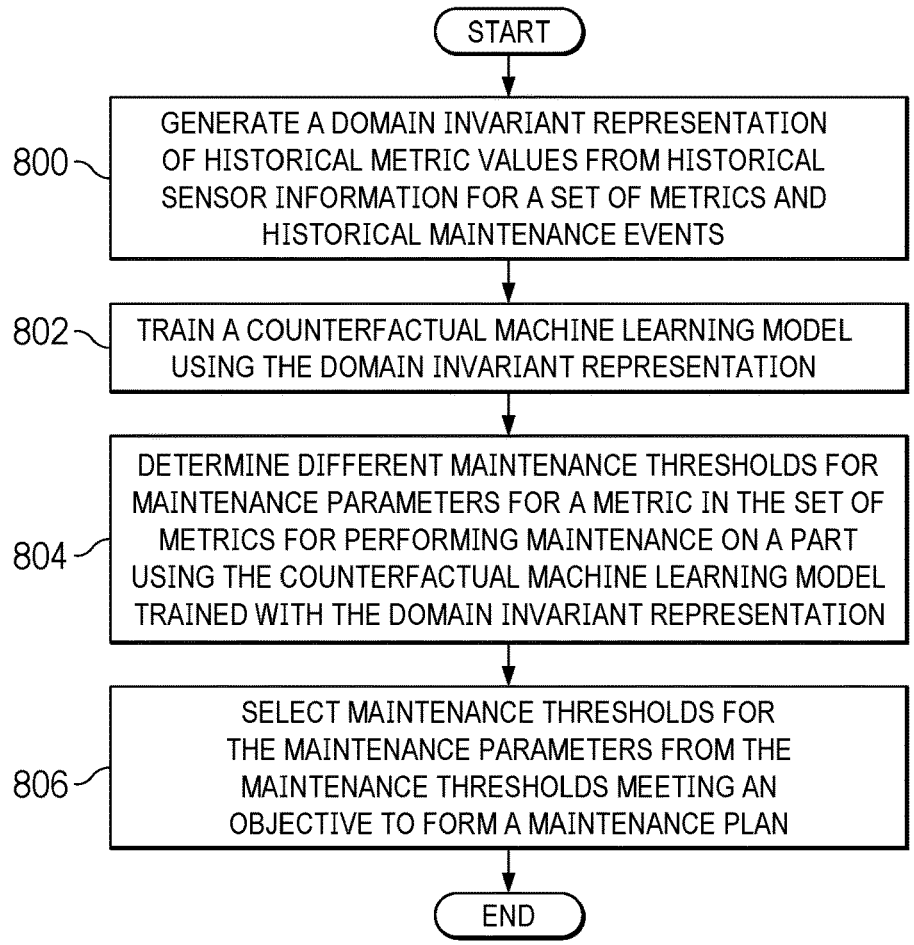
FIG. 8 is an illustration of a flowchart of a process for managing a platform in accordance with an illustrative embodiment.

Turning next to FIG. 8, an illustration of a flowchart of a process for managing a platform is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in platform manager 210 in computer system 208 in FIG. 2.

The process begins by generating a domain invariant representation of historical metric values from historical sensor information for a set of metrics and historical maintenance events (operation 800). In operation 800, a bias caused by the historical maintenance events is reduced in the domain invariant representation.

The process trains a counterfactual machine learning model using the domain invariant representation (operation 802). The process determines different maintenance thresholds for maintenance parameters for a metric in the set of metrics for performing maintenance on a part using the counterfactual machine learning model trained with the domain invariant representation (operation 804). The process selects maintenance thresholds for the maintenance parameters from the maintenance thresholds meeting an objective to form a maintenance plan (operation 806). The process terminates thereafter. In operation 806, the maintenance plan is used to determine a maintenance action for the part.

Figure 9:
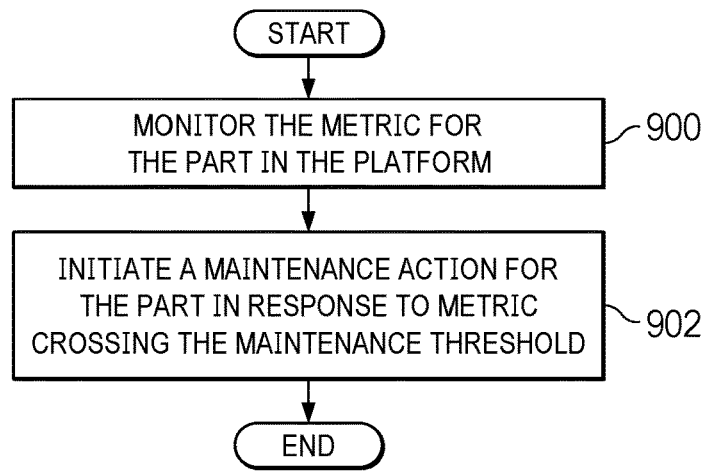
FIG. 9 is an illustration a flowchart of a process for monitoring a part in accordance with an illustrative embodiment.

With reference now to FIG. 9, an illustration a flowchart of a process for monitoring a part is depicted in accordance with an illustrative embodiment. The operations in this figure can be used in the operations in process in FIG. 8.

The process monitors monitoring the metric for the part in the platform (operation 900). The process initiates a maintenance action for the part in response to metric crossing the maintenance threshold (operation 902). The process terminates thereafter.

Figure 10:
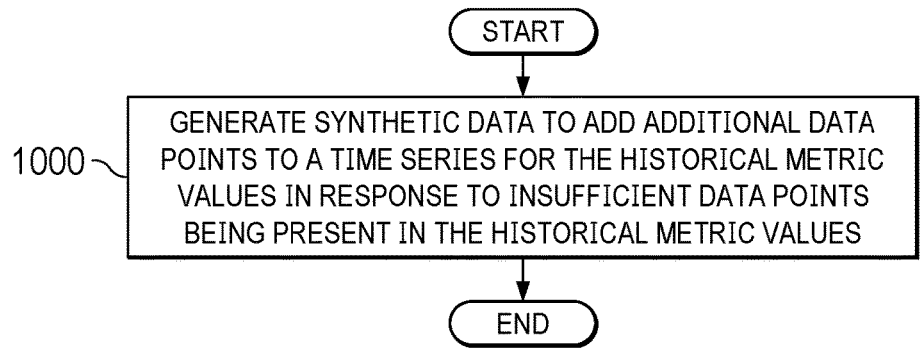
FIG. 10 is an illustration a flowchart of a process for generating synthetic data in accordance with an illustrative embodiment.

Turning to FIG. 10, an illustration of a flowchart of a process for generating synthetic data is depicted in accordance with an illustrative embodiment. The operations in this figure can be used in the operations in process in FIG. 8.

The process generates synthetic data to add additional data points to a time series for the historical metric values in response to insufficient data points being present in the historical metric values (operation 1000). The process terminates thereafter. In operation 1000, the additional data points provide a desired sample rate for the time series.

Figure 11:
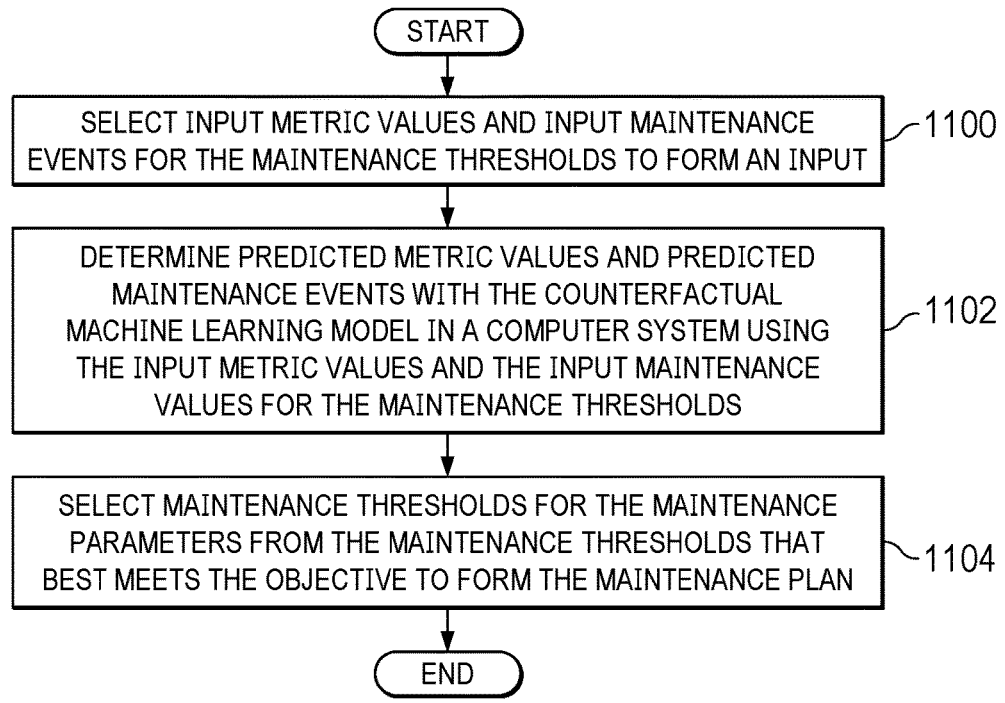
FIG. 11 is an illustration a flowchart of a process for selecting maintenance threshold in accordance with an illustrative embodiment.

In FIG. 11, an illustration of a flowchart of a process for selecting maintenance threshold is depicted in accordance with an illustrative embodiment. The process in this figure is an example of an implementation for operation 806 in FIG. 8.

The process begins by selecting input metric values and input maintenance events for the different maintenance thresholds to form an input (operation 1100). The process determines predicted metric values and predicted maintenance events with the counterfactual machine learning model in a computer system using the input metric values and the input maintenance values for the maintenance thresholds (operation 1102).

The process selects maintenance thresholds for the maintenance parameters from the maintenance thresholds that best meets the objective to form the maintenance plan (operation 1104). The process terminates thereafter. In operation 1104, the predicted metric values and predicted maintenance events generated for the different maintenance thresholds are analyzed to determine which maintenance threshold in the maintenance thresholds best meets the objective. In this illustrative example, the objective can take a number of different forms. For example, objective can be selected from a group comprising increased life part, reduced maintenance expense, increased time between maintenance, increased maintenance-free operation period, and reducing part failure between maintenance events, and other suitable objectives.

Figure 12:
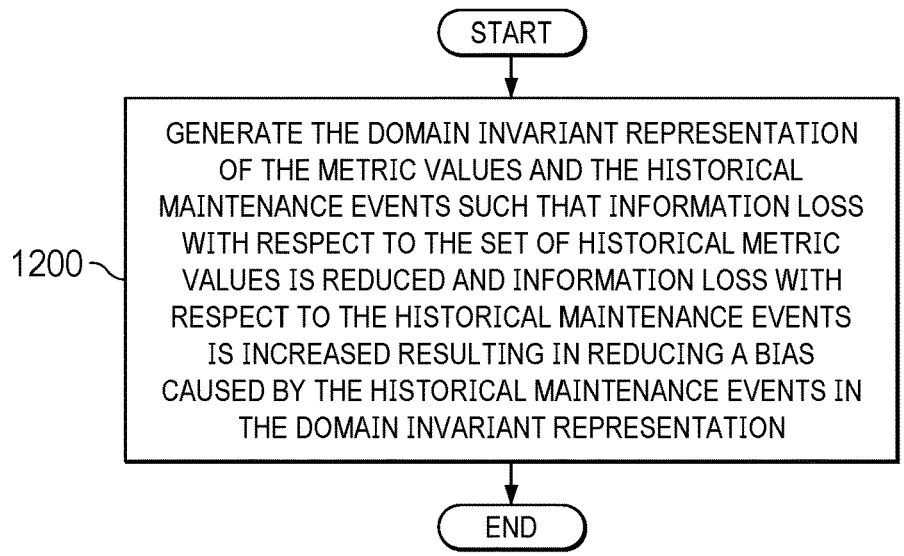
FIG. 12 is an illustration a flowchart of a process for generating a domain invariant representation in accordance with an illustrative embodiment.

With reference now to FIG. 12, an illustration a flowchart of a process for generating a domain invariant representation is depicted in accordance with an illustrative embodiment. The process in this figure is an example of an implementation for operation 800 in FIG. 8.

The process generates the domain invariant representation of the metric values and the historical maintenance events such that information loss with respect to the set of historical metric values is reduced and information loss with respect to the historical maintenance events is increased resulting in reducing a bias caused by the historical maintenance events in the domain invariant representation (operation 1200). The process terminates thereafter.

Figure 13:
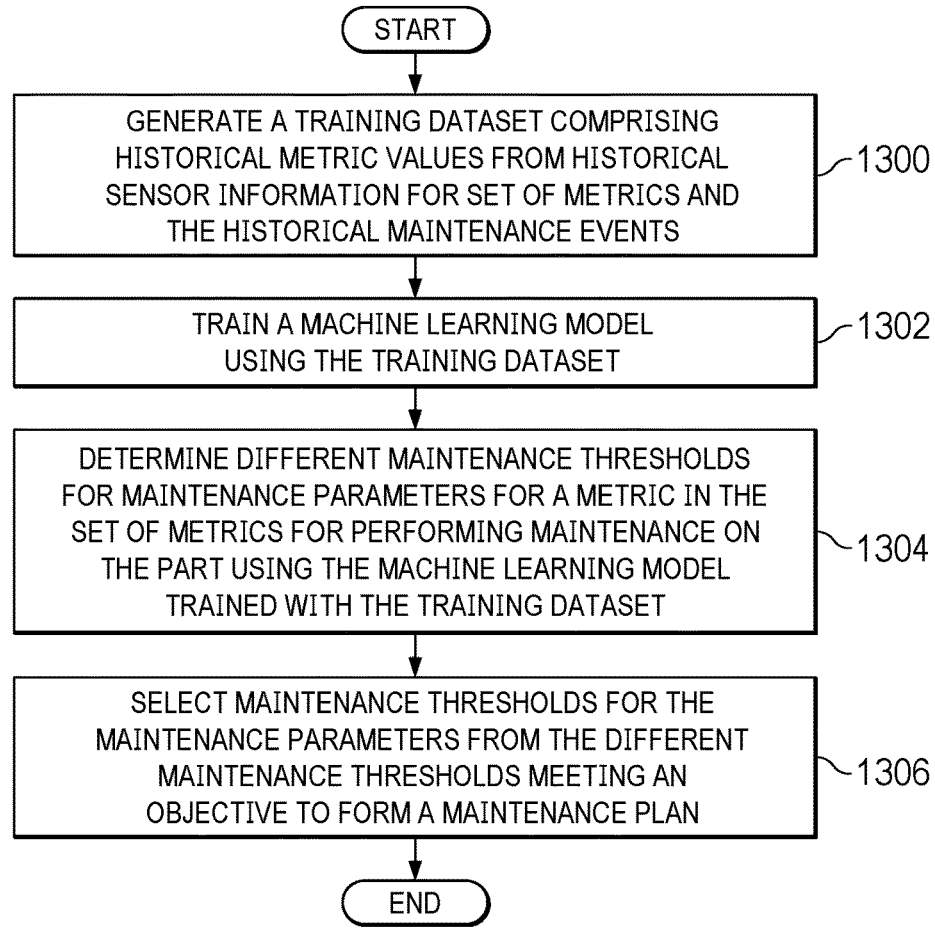
FIG. 13 is an illustration of a flowchart of a process for managing a platform in accordance with an illustrative embodiment.

Turning to FIG. 13, an illustration of a flowchart of a process for managing a platform is depicted in accordance with an illustrative embodiment. The process in FIG. 13 can be implemented in hardware, software, or both. When implemented in software, the process can take the form of program code that is run by one of more processor units located in one or more hardware devices in one or more computer systems. For example, the process can be implemented in platform manager 210 in computer system 208 in FIG. 2.

The process begins by generating a training dataset comprising historical metric values from historical sensor information for set of metrics and the historical maintenance events (operation 1300). The process trains a machine learning model using the training dataset (operation 1302).

The process determines different maintenance thresholds for maintenance parameters for a metric in the set of metrics for performing maintenance on the part using the machine learning model trained with the training dataset (operation 1304). The process selects maintenance thresholds for the maintenance parameters from the different maintenance thresholds meeting an objective to form a maintenance plan (operation 1306). The process terminates thereafter. The maintenance plan is used to determine when a maintenance action is needed for the part.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
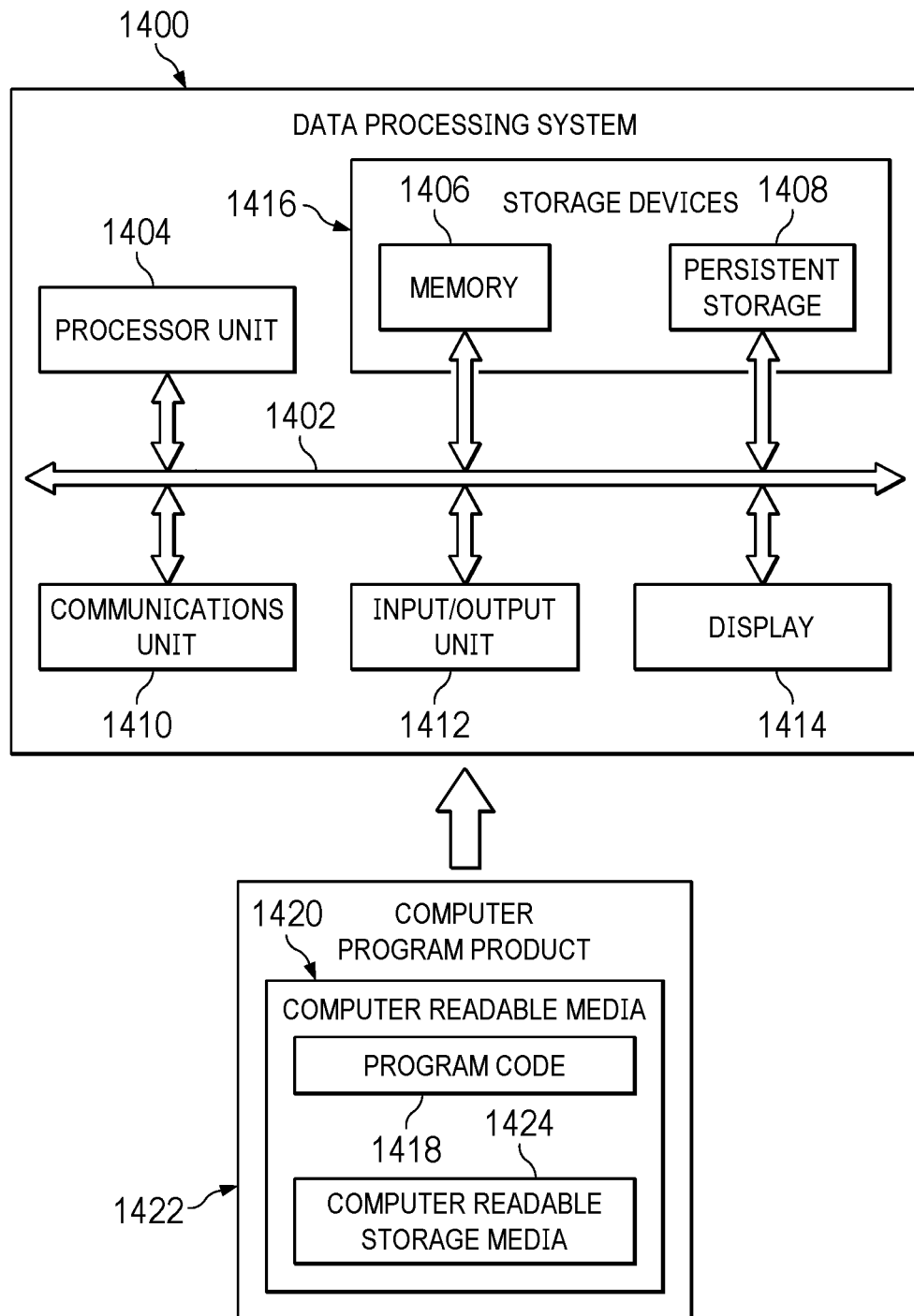
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 208 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 can take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 can provide a connection for user input through at least one of a keyboard, a mouse, or some other suitable input device.

Further, input/output unit 1412 can send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which can be located in a memory, such as memory 1406.

These instructions are program instructions and are also referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer readable media 1420 that is selectively removable and can be loaded onto or transferred to data processing system 1400 for execution by processor unit 1404. Program code 1418 and computer readable media 1420 form computer program product 1422 in these illustrative examples. In the illustrative example, computer readable media 1420 is computer readable storage media 1424.

Computer-readable storage media 1424 is a physical or tangible storage device used to store program code 1418 rather than a media that propagates or transmits program code 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1418 can be transferred to data processing system 1400 using a computer-readable signal media. The computer-readable signal media are signals and can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1420" can be singular or plural. For example, program code 1418 can be located in computer readable media 1420 in the form of a single storage device or system. In another example, program code 1418 can be located in computer readable media 1420 that is distributed in multiple data processing systems. In other words, some instructions in program code 1418 can be located in one data processing system while other instructions in program code 1418 can be located in one data processing system. For example, a portion of program code 1418 can be located in computer readable media 1420 in a server computer while another portion of program code 1418 can be located in computer readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, can be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

Figure 15:
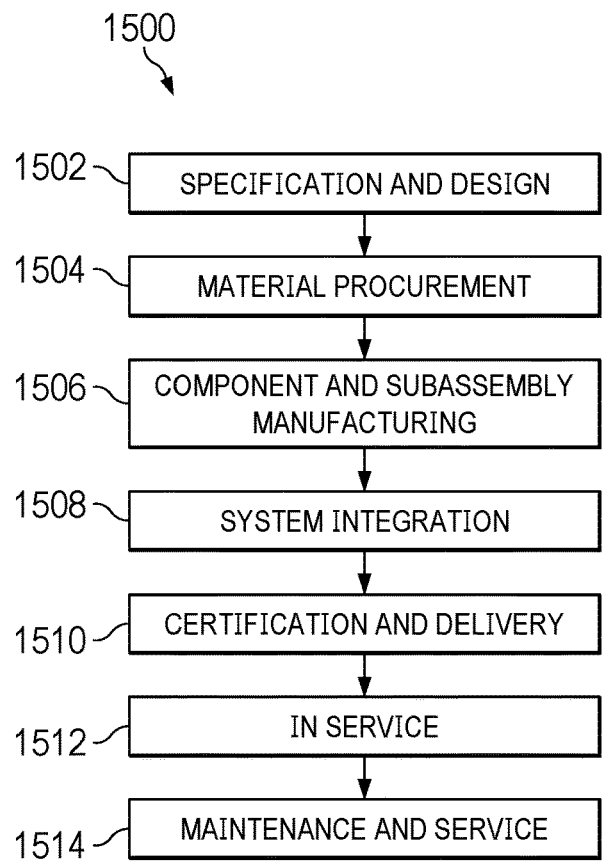
FIG. 15 is an illustration of an aircraft manufacturing and service method in accordance with an illustrative embodiment.
Figure 16:
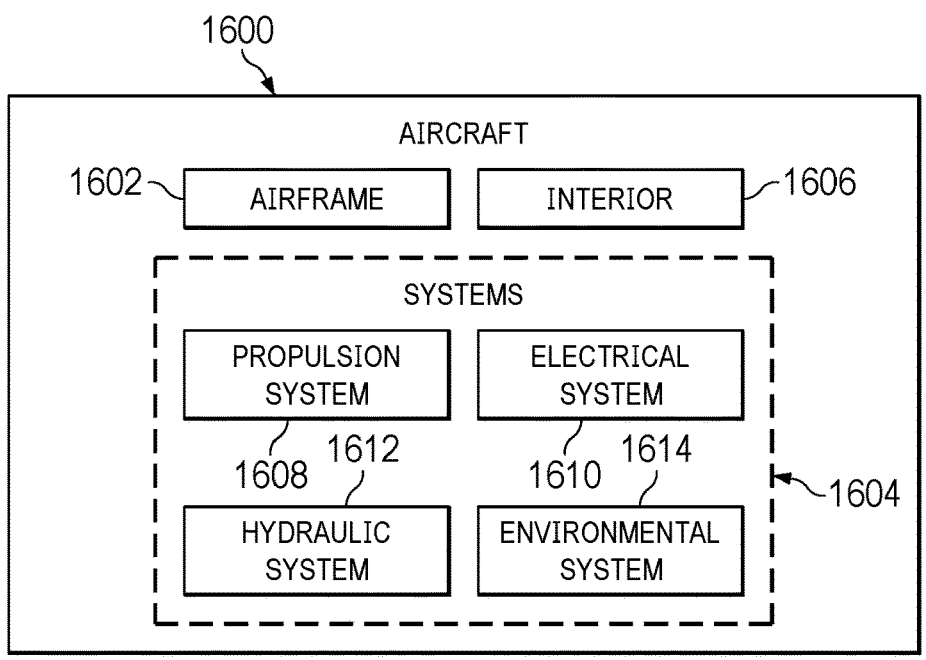
FIG. 16 is an illustration of a block diagram of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 can go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

In the illustrative example, platform manager 130 in FIG. 1 and platform manager 210 in FIG. 2 can operate to manage maintenance for aircraft 1600 during routine maintenance and service 1514. A machine learning model can be used to into account maintenance events in determining these maintenance thresholds for parts in aircraft 1600. Counterfactual forecasts can provide predictions for metrics and maintenance to select maintenance thresholds for performing maintenance actions on parts in aircraft 1600.

Each of the processes of aircraft manufacturing and service method 1500 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 can be fabricated or manufactured in a manner similar to components or subassemblies produced while aircraft 1600 is in service 1512 in FIG. 15. As yet another example, one or more apparatus embodiments, method embodiments, or a combination thereof can be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. The use of a number of the different illustrative embodiments may substantially expedite the assembly of aircraft 1600, reduce the cost of aircraft 1600, or both expedite the assembly of aircraft 1600 and reduce the cost of aircraft 1600.

Some features of the illustrative examples are described in the following clauses. These clauses are examples of features not intended to limit other illustrative examples.

Clause 1

A method for managing a platform, the method comprising:
generating, by a computer system, a domain invariant representation of historical metric values from historical sensor information for a set of metrics and historical maintenance events for a part, wherein a bias caused by the historical maintenance events is reduced in the domain invariant representation;
training, by the computer system, a counterfactual machine learning model using the domain invariant representation;
determining, by the computer system, different maintenance thresholds for maintenance parameters for a metric in the set of metrics for performing maintenance on the part using the counterfactual machine learning model trained with the domain invariant representation; and
selecting, by the computer system, maintenance thresholds for the maintenance parameters from the different maintenance thresholds meeting an objective to form a maintenance plan, wherein the maintenance plan is used to determine a maintenance action for the part.

Clause 2

The method according to clause 1 further comprising:
monitoring the metric for the part in the platform; and
initiating the maintenance action for the part in response to the metric crossing the maintenance thresholds.

Clause 3

The method according to one of clauses 1 or 2, wherein selecting, by the computer system, the maintenance thresholds comprises:
selecting input metric values and input maintenance events for the different maintenance thresholds to form an input;
determining predicted metric values and predicted maintenance events with the counterfactual machine learning model in the computer system using the input metric values and the input maintenance events for the maintenance thresholds; and
selecting the maintenance thresholds for the maintenance parameters from the different maintenance thresholds that best meets the objective to form the maintenance plan.

Clause 4

The method according to one of clauses 1, 2, or 3, wherein the objective is selected from a group comprising increased life part, reduced maintenance expense, increased time between maintenance, reducing part failure between maintenance events, increased maintenance free operating period, increased mean time between failures, and increased mission success rate.

Clause 5

The method according to one of clauses 1, 2, 3, or 4 further comprising:
generating, by the computer system, synthetic data to add additional data points to a time series for the historical metric values in response to sufficient data points being absent in the historical metric values, wherein the additional data points provide a desired sample rate for the time series.

Clause 6

The method according to one of clauses 1, 2, 3, 4, or 5, wherein generating, by the computer system, the domain invariant representation of the historical metric values and the historical maintenance events comprises:
generating, by the computer system, the domain invariant representation of the historical metric values and the historical maintenance events such that information loss with respect to the historical metric values is reduced and information loss with respect to the historical maintenance events is increased resulting in reducing the bias caused by the historical maintenance events in the domain invariant representation.

Clause 7

The method according to one of clauses 1, 2, 3, 4, 5, or 6, wherein the set of metrics is stored in a matrix having n historical metric values for k metrics in the set of metrics and the historical maintenance events are stored in a vector.

Clause 8

The method according to one of clauses 1, 2, 3, 4, 5, 6, or 7, wherein the set of metrics is selected from at least one of a condition indicator or a health indicator.

Clause 9

The method according to one of clauses 1, 2, 3, 4, 5, 6, 7, or 8, wherein the counterfactual machine learning model is one of a neural network, a recurrent neural network, a long short-term memory neural network, and a gate recurrent unit neural network, convolutional recurrent neural network, and a Bayesian network.

Clause 10

The method according to one of clauses 1, 2, 3, 4, 5, 6, 7, 8, or 9, the method comprising:
generating, by a computer system, a training dataset comprising historical metric values from historical sensor information for a set of metrics and historical maintenance events for a part;
training, by the computer system, a machine learning model using the training dataset;
determining, by the computer system, different maintenance thresholds for maintenance parameters for a metric in the set of metrics for performing maintenance on the part using the machine learning model trained with the training dataset; and
selecting, by the computer system, maintenance thresholds for the maintenance parameters from the different maintenance thresholds meeting an objective to form a maintenance plan, wherein the maintenance plan is used to determine when a maintenance action is needed for the part.

Clause 11

A platform management system comprising:
a computer system; and
a platform manager in the computer system, wherein the platform manager is configured to:
generate a domain invariant representation of historical metric values from historical sensor information for a set of metrics and historical maintenance events for a part, wherein a bias caused by the historical maintenance events is reduced in the domain invariant representation;

train a counterfactual machine learning model using the domain invariant representation;

determine different maintenance thresholds for maintenance parameters for a metric in the set of metrics for performing maintenance on the part using the counterfactual machine learning model trained with the domain invariant representation; and select maintenance thresholds for the maintenance parameters from the different maintenance thresholds meeting an objective to form a maintenance plan, wherein the maintenance plan is used to determine a maintenance action for the part.

Clause 12

The platform management system according to clause 11, wherein the platform manager is configured to:

monitor the metric for the part in a platform; and initiate the maintenance action for the part in response to the metric crossing the maintenance threshold.

Clause 13

The platform management system according to one of clauses 11 or 12, wherein selecting the maintenance thresholds, the platform manager is configured to:

select input metric values and input maintenance events for the different maintenance thresholds for the maintenance parameters to form an input;

determine predicted metric values and predicted maintenance events with the counterfactual machine learning model in the computer system using the input metric values and the input maintenance events for the maintenance thresholds; and select the maintenance thresholds from the different maintenance thresholds for the maintenance parameters that best meets the objective to form the maintenance plan.

Clause 14

The platform management system according to one of clauses 11, 12, or 13, wherein the objective is selected from a group comprising increased life part, reduced maintenance expense, increased time between maintenance, reducing part failure between maintenance events, increased maintenance free operating period, increased mean time between failures, and increased mission success rate.

Clause 15

The platform management system according to one of clauses 11, 12, 13, or 14, wherein the platform manager is configured to:

generate synthetic data to add additional data points to a time series for the historical metric values in response to sufficient data points being absent in the historical metric values, wherein the additional data points provide a desired sample rate for the time series.

Clause 16

The platform management system according to one of clauses 11, 12, 13, 14, or 15, in generating the domain invariant representation of the historical metric values and the historical maintenance events, the platform manager is configured to:

generate the domain invariant representation of the historical metric values and the historical maintenance events such that information loss with respect to the historical metric values is reduced and information loss with respect to the historical maintenance events is increased resulting in reducing the bias caused by the historical maintenance events in the domain invariant representation.

Clause 17

The platform management system according to one of clauses 11, 12, 13, 14, 15, or 16, wherein the set of metrics is stored in a matrix having n historical metric values for k metrics in the set of metrics and the historical maintenance events are stored in a vector.

Clause 18

The platform management system according to one of clauses 11, 12, 13, 14, 15, 16, or 17, wherein the set of metrics is selected from at least one of a condition indicator or a health indicator.

Clause 19

The platform management system according to one of clauses 11, 12, 13, 14, 15, 16, 17, or 18, wherein the counterfactual machine learning model is one of a neural network, a recurrent neural network, a long short-term memory neural network, and a gate recurrent unit neural network, convolutional recurrent neural network, and a Bayesian network.

Clause 20

A platform management system comprising:

a computer system; and a platform manager in the computer system, wherein the platform manager is configured to:

generate a training dataset comprising historical metric values from historical sensor information for a set of metrics for and historical maintenance events for a part;

train a machine learning model using the training dataset;

determine different maintenance thresholds for maintenance parameters for a metric in the set of metrics for performing maintenance on the part using the machine learning model trained with the training dataset; and select maintenance thresholds for the maintenance parameters from the different maintenance thresholds meeting an objective to form a maintenance plan, wherein the maintenance plan is used to determine when a maintenance action is needed for the part.

Thus, the use of maintenance thresholds selected based on predictions of metric values and maintenance events increase the accuracy in determining when maintenance is needed based on these maintenance thresholds. As a result, fleet managers and local maintenance personnel can procure replacement parts ahead of time. With these maintenance thresholds for the maintenance parameters, the allocation of resources for maintenance can be scheduled especially with some locations that have limitations on maintenance resources.

With the selection of these maintenance thresholds, a reaction maintenance schedule in which an aircraft or other vehicle is essentially grounded while replacements and repairs are requested, bordered, and then delivered can be avoided. With the use of maintenance thresholds for maintenance parameters, identifying impending needs for maintenance head of time in a manner that avoids undesired performance can allow for better scheduling amendments. The maintenance can include providing option of relocating of vehicle to a maintenance center having appropriate resources for maintenance as well as providing increased lead times for scheduling personnel in making part requests.

In this manner, the use of these maintenance thresholds can reduce the burden performing maintenance in the field and reduce maintenance expenses. Further, with the use of maintenance thresholds, the occurrence of anomalies resulting in undesired part performance can also be reduced.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing a cost and an out of service time for inspecting, reworking, or replacing, a part on an aircraft, the method comprising:
    measuring, with a sensor for the part on the aircraft, an environment for the aircraft and metrics for the part on the aircraft;
    sending measurements of the environment and the metrics from the sensor to a processor comprising code specially programmed for:
        generating a domain invariant representation of historical metric values from historical sensor information for a set of metrics and historical maintenance events for a part, wherein a bias caused by the historical maintenance events is reduced in the domain invariant representation;
        training a counterfactual machine learning model using the domain invariant representation to predict sensor data and a maintenance event;
        determining different maintenance thresholds for maintenance parameters for a metric in the set of metrics for performing maintenance on the part on the aircraft using the counterfactual machine learning model trained with the domain invariant representation;
        selecting maintenance thresholds for the maintenance parameters from the different maintenance thresholds meeting an objective forming a maintenance plan for inspecting, reworking, or replacing, the part before a failure of the part on the aircraft; and
        using the maintenance plan, executing at least one of: inspecting, reworking, or replacing the part before the failure of the part on the aircraft.

2. The method of claim 1, further comprising:
    monitoring the metrics for the part; and
    using the maintenance plan in response to the metric crossing the maintenance thresholds.

3. The method of claim 1, further comprising the processor:
    selecting input metric values and input maintenance events for the different maintenance thresholds to form an input;
    determining predicted metric values and predicted maintenance events with the counterfactual machine learning model using the input metric values and the input maintenance events for the maintenance thresholds; and
    selecting the maintenance thresholds for the maintenance parameters from the different maintenance thresholds that best meets the objective to form the maintenance plan.

4. The method of claim 1, wherein the objective comprises at least one of: an increased life of a part, a reduced maintenance expense, an increased time between maintenance, a reduced part failure between maintenance events, an increased maintenance free operating period, an increased mean time between failures, or an increased mission success rate.

5. The method of claim 1, further comprising the processor:
    generating, in response to insufficient data points in the historical metric values, synthetic data to adding additional data points to a time series for the historical metric values in response to sufficient data points being absent in the historical metric values, wherein the additional data points provide a desired sample rate for the time series.

6. The method of claim 1, further comprising the processor:
    generating the domain invariant representation of the historical metric values and the historical maintenance events such that information loss with respect to the historical metric values is reduced and information loss with respect to the historical maintenance events is increased resulting in reducing the bias caused by the historical maintenance events in the domain invariant representation.

7. The method of claim 1, wherein the set of metrics is stored in a matrix having n historical metric values for k metrics in the set of metrics and the historical maintenance events are stored in a vector.

8. The method of claim 1, wherein the set of metrics is selected from at least one of a condition indicator or a health indicator.

9. The method of claim 1, wherein the counterfactual machine learning model is one of a neural network, a recurrent neural network, a long short-term memory neural network, and a gate recurrent unit neural network, convolutional recurrent neural network, and a Bayesian network.

10. A method for reducing a cost and an out of service time for inspecting, reworking, or replacing, a part on an aircraft, the method comprising:
    measuring, with a sensor on the aircraft for the part on the aircraft, an environment for the aircraft and metrics for the part on the aircraft;
    sending measurements of the environment and the metrics from the sensor to a processor off the aircraft comprising code specially programmed for:
        generating, by a computer system, a training dataset comprising a domain invariant representation of historical metric values from historical sensor information for a set of metrics and historical maintenance events for the part on the aircraft;
        training, by the computer system, a machine learning model using the training dataset;
        predicting, using the machine learning model, sensor data and a maintenance event;
        determining, by the computer system, different maintenance thresholds for maintenance parameters for a metric in the set of metrics for performing maintenance on the part on the aircraft using the machine learning model trained with the training dataset; and selecting, by the computer system, maintenance thresholds for the maintenance parameters from the different maintenance thresholds meeting an objective forming a maintenance plan comprising inspecting, reworking, or replacing, the part on the aircraft;

determining, prior to a failure of the part on the aircraft and using the maintenance plan, when an inspection, a rework, or a replacement is needed for the part on the aircraft; and executing, before a failure of the part, at least one of: the inspection, the rework, or the replacement of the part on the aircraft.

11. An aircraft maintenance system that comprises:

a sensor, on an aircraft for a part on an aircraft, configured to measure an environment for the aircraft and metrics for the part on the aircraft;

a computer system that comprises a processor that comprises code configured to receive measurements of the environment and the metrics from the sensor and process them to:

generate a domain invariant representation of historical metric values from historical sensor information for a set of metrics and historical maintenance events for the part on the aircraft, wherein a bias caused by the historical maintenance events is reduced in the domain invariant representation;

train, based upon the domain invariant representation, a counterfactual machine learning model configured to predict sensor data and a maintenance event;

determine different maintenance thresholds for maintenance parameters for a metric in the set of metrics for performing maintenance on the part on the aircraft based on the counterfactual machine learning model trained with the domain invariant representation;

predict, based upon the counterfactual machine learning model trained with the domain invariant representation, predicted maintenance parameters; and select maintenance thresholds for the maintenance parameters from the different maintenance thresholds that satisfy an objective to form a maintenance plan, wherein a maintenance action for the part on the aircraft is based upon the predicted maintenance parameters crossing the maintenance thresholds;

direct, prior to a failure of the part on the aircraft, an inspection, a rework, or a replacement of the part on the aircraft.

12. The aircraft maintenance system of claim 11, further configured to:

monitor the metrics for the part on the aircraft; and initiate the maintenance action for the part on the aircraft in response to the metric crossing the maintenance threshold.

13. The aircraft maintenance system of claim 11, further configured to:

select input metric values and input maintenance events for the different maintenance thresholds for the maintenance parameters to form an input;

determine predicted metric values and predicted maintenance events with the counterfactual machine learning model in the computer system using the input metric values and the input maintenance events for the maintenance thresholds; and select the maintenance thresholds from the different maintenance thresholds for the maintenance parameters that best meets the objective to form the maintenance plan.

14. The aircraft maintenance system of claim 11, wherein the objective comprises at least one of: an increased life of a part, a reduced maintenance expense, an increased time between maintenance, a reduced part failure between maintenance events, an increased maintenance free operating period, an increased mean time between failures, or an increased mission success rate.

15. The aircraft maintenance system of claim 11, further configured to generate synthetic data to add additional data points to a time series for the historical metric values in response to sufficient data points being absent in the historical metric values, wherein the additional data points provide a desired sample rate for the time series.

16. The aircraft maintenance system of claim 11, further configured to generate the domain invariant representation of the historical metric values and the historical maintenance events such that information loss with respect to the historical metric values is reduced and information loss with respect to the historical maintenance events is increased resulting in reducing the bias caused by the historical maintenance events in the domain invariant representation.

17. The aircraft maintenance system of claim 11, wherein the set of metrics is stored in a matrix having n historical metric values for k metrics in the set of metrics and the historical maintenance events are stored in a vector.

18. The aircraft maintenance system of claim 11, wherein the set of metrics is selected from at least one of a condition indicator or a health indicator.

19. The aircraft maintenance system of claim 11, wherein the counterfactual machine learning model is one of a neural network, a recurrent neural network, a long short-term memory neural network, and a gate recurrent unit neural network, convolutional recurrent neural network, and a Bayesian network.

20. An aircraft maintenance system that comprises:

a sensor on an aircraft for a part on the aircraft configured to measure an environment for the aircraft and metrics for the part on the aircraft;

a computer system that comprises a platform manager in the computer system that comprises code configured to receive measurements of the environment and the metrics from the sensor and process them to:

generate a training dataset comprising a domain invariant representation of historical metric values from historical information from a sensor for a set of metrics for and historical maintenance events for the part on the aircraft, wherein a bias caused by the historical maintenance events is reduced in the domain invariant representation;

train, based upon the training data set, a machine learning model to predict sensor data and a maintenance event;

determine different maintenance thresholds for maintenance parameters for a metric in the set of metrics for performing maintenance on the part on the aircraft based upon the machine learning model trained with the training dataset;

predict a predicted metric for the part on the aircraft; and select maintenance thresholds for the maintenance parameters from the different maintenance thresholds meeting an objective to form a maintenance plan, wherein the maintenance plan is used to determine when an inspection, a rework, or a replacement is needed for the part;

assign, based upon the predicted metric exceeding the maintenance thresholds and the maintenance plan, one of: an inspection, a rework, or a replacement, of the part on the aircraft prior to a failure of the part on the aircraft.

* * * * *

UNITED STATES PATENT AND TRADEMARK OFFICE
CERTIFICATE OF CORRECTION

PATENT NO. : 12,288,425 B2
APPLICATION NO. : 17/805007
DATED : April 29, 2025
INVENTOR(S) : Alexander Norman Waagen et al.

Page 1 of 1

It is certified that error appears in the above-identified patent and that said Letters Patent is hereby corrected as shown below:

In the Claims

Column 32, Line 18, correct "synthetic data to adding" to read -- synthetic data adding --

Signed and Sealed this
Twenty-seventh Day of May, 2025

Coke Morgan Stewart
*Acting Director of the United States Patent and Trademark Office*